(12) United States Patent
Isreal et al.

(10) Patent No.: US 6,330,007 B1
(45) Date of Patent: Dec. 11, 2001

(54) GRAPHICAL USER INTERFACE (GUI) PROTOTYPING AND SPECIFICATION TOOL

(75) Inventors: Jack B. Isreal, Suwanee, GA (US); Mark D. Lee, Norfolk, VA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/215,136

(22) Filed: Dec. 18, 1998

(51) Int. Cl.[7] .................................................. G06F 3/00
(52) U.S. Cl. .......................... 345/762; 345/765; 345/764; 707/501.1; 707/513; 717/1
(58) Field of Search ..................... 345/334, 333, 345/335, 339, 356, 357; 707/104, 501, 513; 717/1, 4

(56) References Cited

U.S. PATENT DOCUMENTS

| | | | |
|---|---|---|---|
| 5,844,554 | * | 12/1998 | Geller et al. .......................... 345/333 |
| 5,883,639 | * | 3/1999 | Walton et al. ......................... 345/334 |
| 6,118,445 | * | 9/2000 | Nonomura et al. .................... 345/328 |
| 6,124,855 | * | 9/2000 | Sells ..................................... 345/333 |
| 6,148,241 | * | 11/2000 | Ludtke et al. ......................... 700/83 |
| 6,157,936 | * | 12/2000 | Mutschler, III et al. ............. 707/513 |
| 6,175,363 | * | 1/2001 | Williams et al. ..................... 345/334 |

* cited by examiner

*Primary Examiner*—Raymond J. Bayerl
*Assistant Examiner*—Cuong T. Thai
(74) *Attorney, Agent, or Firm*—Lowe Hauptman Gilman & Berner, LLP

(57) ABSTRACT

A Dynakey Screen Generator (DSG) is disclosed which is a graphical user interface prototyping and specification tool. DSG is a Microsoft Windows-based tool for prototyping and specifying a graphical user interface having dynamic keys. More specifically, the present invention preferably is a Microsoft Visual Basic application and preferably uses an underlying Microsoft Access database. Advantageously, the present invention allows a user interface designer (the "author") to enter design specifications into forms. The design specifications cover the general, visual style of the user interface being designed, as well as the specific design of each screen. Once the specifications (stored in the Access database) have been entered, an "end user" (e.g., interface designer, developer, customer, potential end user) can immediately "run" the specification as an interactive prototype.

27 Claims, 35 Drawing Sheets

FIG. 37

| Global Comments | | | | |
|---|---|---|---|---|
| General | Static Key Defaults | Graphics & Colors | | Change History |
| Default Screen Background | bg_mainbackground.bmp | Default Dynakey Background | button.bmp | |
| Title | Color: 0, 0, 0<br>Font: | Date | Color: 73, 56, 125<br>Font: | |
| Prompt | Color: 73, 56, 125<br>Font: | Message | Normal: 146, 136, 176  Error: 255, 0, 0<br>Font: | |
| Dynakey | Color: 0, 0, 0<br>Font: | Dynakey | Color: 0, 0, 0<br>Font: | |
| Receipt Print | ReceiptPrint.bmp | Scroll One Down | ScrollOneDown.bmp | |
| Advance Deposit | AdvanceDeposit.bmp | Scroll Page Down | ScrollPageDown.bmp | |
| Laser Print | LaserPrint.bmp | Scroll One Up | ScrollOneUp.bmp | |
| Degraded Mode | DegradedMode.bmp | Scroll Page Up | ScrollPageUp.bmp | |
| Survey Mode | SurveyMode.bmp | Wait | Wait.bmp | |
| Electronic Receipt | Background Color: 255, 255, 255<br>Contrast Color: 189, 214, 181<br>Valid Item Color: 0, 0, 0<br>Valid Item Font:<br>Invalid Item Color: 132, 132, 132<br>Invalid Item Font: | Pick List | Background Color: 255, 255, 255<br>Contrast Color: 198, 214, 173<br>Valid Item Color: 0, 0, 0<br>Valid Item Font:<br>Invalid Item Color: 132, 132, 132<br>Invalid Item Font: | |
| Form | Background Color: 255, 255, 255<br>Valid Required Item Color: 0, 0, 0<br>Valid Required Item Font:<br>Valid Optional Item Color: 0, 0, 0<br>Valid Optional Item Font:<br>Invalid Item Color: 0, 0, 0<br>Invalid Item Font: | | | |
| Alert | Background: error.bmp<br>Color: 255, 255, 255<br>Font: | Notification | Background: notice.bmp<br>Color: 255, 255, 255<br>Font: | |
| Help | Background: help.bmp<br>Color: 255, 255, 255<br>Font: | | | |

3510 — General
3520 — Static Key Defaults
3530 — Graphics & Colors
3540 — Change History

GRAPHICAL USER INTERFACE (GUI) PROTOTYPING AND SPECIFICATION TOOL

FIELD OF THE INVENTION

The present invention relates generally to a tool for designing a graphical user interface, and more particularly, to a prototyping and specification tool for designing dynamic user interaction screens including user input area, forms, pick lists, electronic receipts, and screen-labeled keys.

BACKGROUND OF THE INVENTION

Graphical user interfaces can be designed using a variety of software applications. The design of a graphical user interface includes prototyping or modeling the graphical user interface before the design is finalized. The design of a graphical user interface also includes a specification which is a detailed description for each of the areas displayed on the graphical user interface. A tool for designing a graphical user interface should provide three functions. The first function is graphical fidelity. For example, the graphical fidelity of a numeric key on a cash register depends on the degree of exactness with which the key is graphically displayed. The second function is the degree of interactivity. Interactivity can be considered the ability to navigate from screen-to-screen or within a single screen. The third function is to provide a complete specification for each area being displayed by the graphical user interface. A specification includes the size and font of typeface to be displayed in an area of the graphical user interface.

For example, a graphical user interface allowing navigation among a plurality of linked screens can be designed using Microsoft Word. Each of the screens would have simulated keys to simulate a keyboard, numeric pad or other controls, for example, on a cash register. Although hyperlinking capability using hypertext links is available in Microsoft Word 97 and Microsoft Word 97 enables screen navigation using simulated keys, the keys are not graphically displayed and the areas on the screen cannot be linked together interactively.

A graphical user interface can also be designed using Microsoft Powerpoint. Microsoft Powerpoint can graphically display simulated keys and has high graphical fidelity. Like Microsoft Word 97, Microsoft Powerpoint also provides screen-to-screen interactivity, but no within-screen interactivity. There is no capability of providing a complete specification using Powerpoint. With Powerpoint, every specification detail must be typed in by the author into a "notes" page whose size is generally inadequate for this purpose.

Previous tools did not include specification details stored in a database. Instead nearly all design specifications had to be typed in by the author.

A need exists in the art for a tool that allows a designer to interactively design and completely specify a graphical user interface including a plurality of screens and be able to run the specified graphical user interface with high graphical fidelity and interactivity.

SUMMARY OF THE INVENTION

It is, therefore, an object of the present invention to provide a tool for prototyping and specifying a graphical user interface using a database.

Another object of the present invention is to provide a tool in which graphical user interfaces can be specified using forms (dialog boxes) to collect information from the author on the specification of the graphical user interface.

It is yet another object of the present invention to provide a prototyping and specifying tool which requires little or no training to use and does not require the author to write code.

It is a further object of the present invention to provide a prototyping and specifying tool which is interactive with the author during a design mode.

It is yet a further object of the present invention to provide a prototyping and specifying tool which can be run following design.

The present invention is called a Dynakey Screen Generator (DSG) and is a Microsoft Windows-based tool for prototyping and specifying a graphical user interface having dynamic keys. More specifically, the present invention preferably is a Microsoft Visual Basic application and preferably uses an underlying Microsoft Access database. Advantageously, the present invention allows a user interface designer (the "author") to enter design specifications into forms. The design specifications cover the general, visual style of the user interface being designed, the specific design of each screen, and navigation among screens. Once the specifications (stored in the Access database) have been entered, an "end user" (e.g., interface designer, developer, customer, potential end user) can immediately "run" the specification as an interactive prototype.

These and other objects of the present invention are achieved by a method of graphically specifying a graphical user interface using information in tables stored in a relational database. A target screen is displayed having a plurality of generic keys, a plurality of screen information buttons and a display area, the keys, the buttons and the display area being graphically displayed. In a screen design dialog box, any one of the generic keys, the screen information buttons and the display area can be selected. A set of controls is associated with the selected key, button or display area. Settings are designated by accessing one or more tables in the relational database for the selected key, button or display area, the settings being graphically displayed.

The foregoing objects of the present invention are also achieved by an article including at least one sequence of machine executable instructions on a medium bearing the executable instructions in machine readable form, wherein execution of the instructions by one or more processors causes the one or more processors to display a target screen having a plurality of generic keys, a plurality of screen information buttons and a display area, the keys, the buttons and the display area being graphically displayed. Any one of the generic keys, the screen information buttons and the display area is selected. A screen associated with the selected key, button or display area is graphically displayed. The file name of the bitmap is read from a table in the relational database. Settings are designated by accessing one or more tables in the relational database for the selected key, button or display area, the settings being graphically displayed.

The foregoing objects of the present invention are also achieved by a computer architecture. The computer architecture includes displaying means for displaying a target screen having a plurality of generic keys, a plurality of screen information buttons and a display area, the keys, the buttons and the display area being graphically displayed. Selecting means are provided for selecting any one of the generic keys, the screen information buttons and the display area. Graphical displaying means are provided for graphically displaying a screen associated with the selected key, button or display area from a table in the relational database.

Designating settings means are provided for designating settings by accessing one or more tables in the relational database for the selected key, button or display area, the settings being graphically displayed.

The foregoing objects of the present invention are also achieved by a computer system including a processor and a memory coupled to the processor, the memory having stored therein sequences of instructions, which, when executed by the processor, causes said processor to perform the steps of displaying a target screen having a plurality of generic keys, a plurality of screen information buttons and a display area, the keys, the buttons and the display area being graphically displayed. In a screen design dialog box, any one of the generic keys, the screen information buttons and the display area can be selected. Settings are designated by accessing one or more tables in the relational database for the selected key, button or display area, the settings being graphically displayed.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 37 is a view of a screen for a graphics and colors tab for global comments.

BEST MODE FOR CARRYING OUT THE INVENTION

A method and apparatus for designing, prototyping and specifying a graphical user interface is described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present invention is called a Dynakey Screen Generator (DSG) and is a Microsoft Windows-based tool for prototyping and specifying a graphical user interface having dynamic keys. More specifically, the present invention preferably is a Microsoft Visual Basic application and preferably uses an underlying Microsoft Access database. Advantageously, the present invention allows a user interface designer (the "author") to enter design specifications into forms. The design specifications cover the general, visual style of the user interface being designed, as well as the specific design of each screen. Once the specifications (stored in the Access database) have been entered, an "end user" (e.g., interface designer, developer, customer, potential end user) can immediately "run" the specification as an interactive prototype.

The present invention allows a user interface designer (the "author") to enter design specifications and supplemental comments into forms. The design specifications cover the general, visual style of the user interface being designed, as well as the specific design of each screen. The specification and supplemental comments stored in the Access database can be queried, and specification reports can be generated either within Access or with the use of a word-processing package (e.g., Microsoft Word), via dynamic data exchange with the database.

The Dynakeys style graphical user interface is created during a design mode which allows a designer to visually build an application by specifying the appearance and behavior of all components of the system. Once any portion of the graphical user interface has been specified, the graphical user interface of the present invention can be run. As used herein, a user is one who views the user interface prototype/specification (e.g., potential end users of the specified application, developers), and authors are those who define the user interface (e.g., human factors engineers).

Hardware Overview

Figure 1:
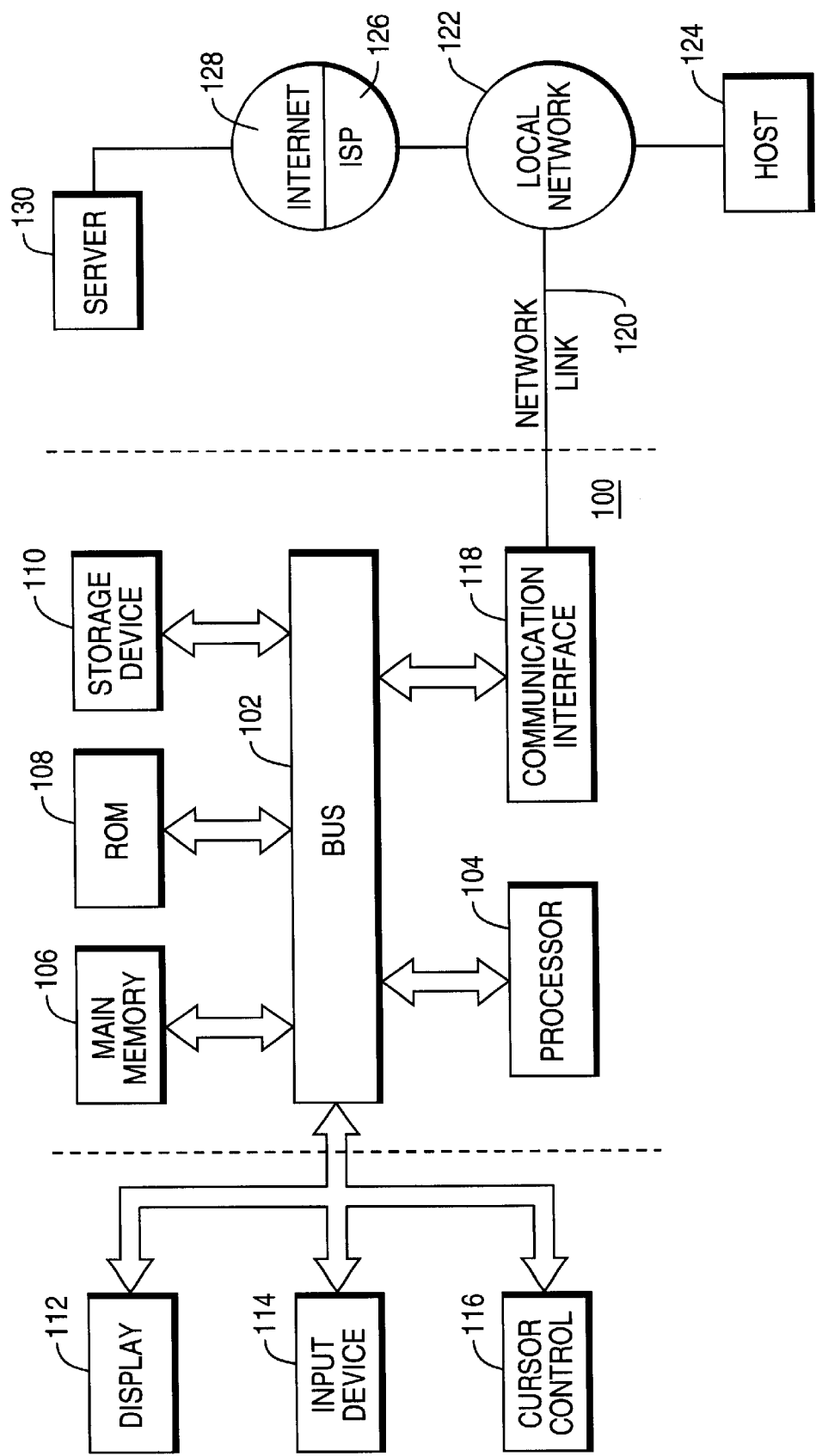
FIG. 1 is a high level block diagram of a computer architecture usable with the current invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to display a graphical user interface prototyping and specification tool. According to one embodiment of the invention, a graphical user interface prototyping and specification tool is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the code for the a graphical user interface prototyping and specification tool. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

DSG addresses needs for a prototyping and specification tool that (1) requires little or no training to use; (2) provides for rapid entry of complex Dynakey-style designs; (3) provides navigation, forms, pick lists, and electronic receipts that are fully interactive; and (4) provides flexibility in user interface style characteristics.

Graphical User Interface

Figure 2A:
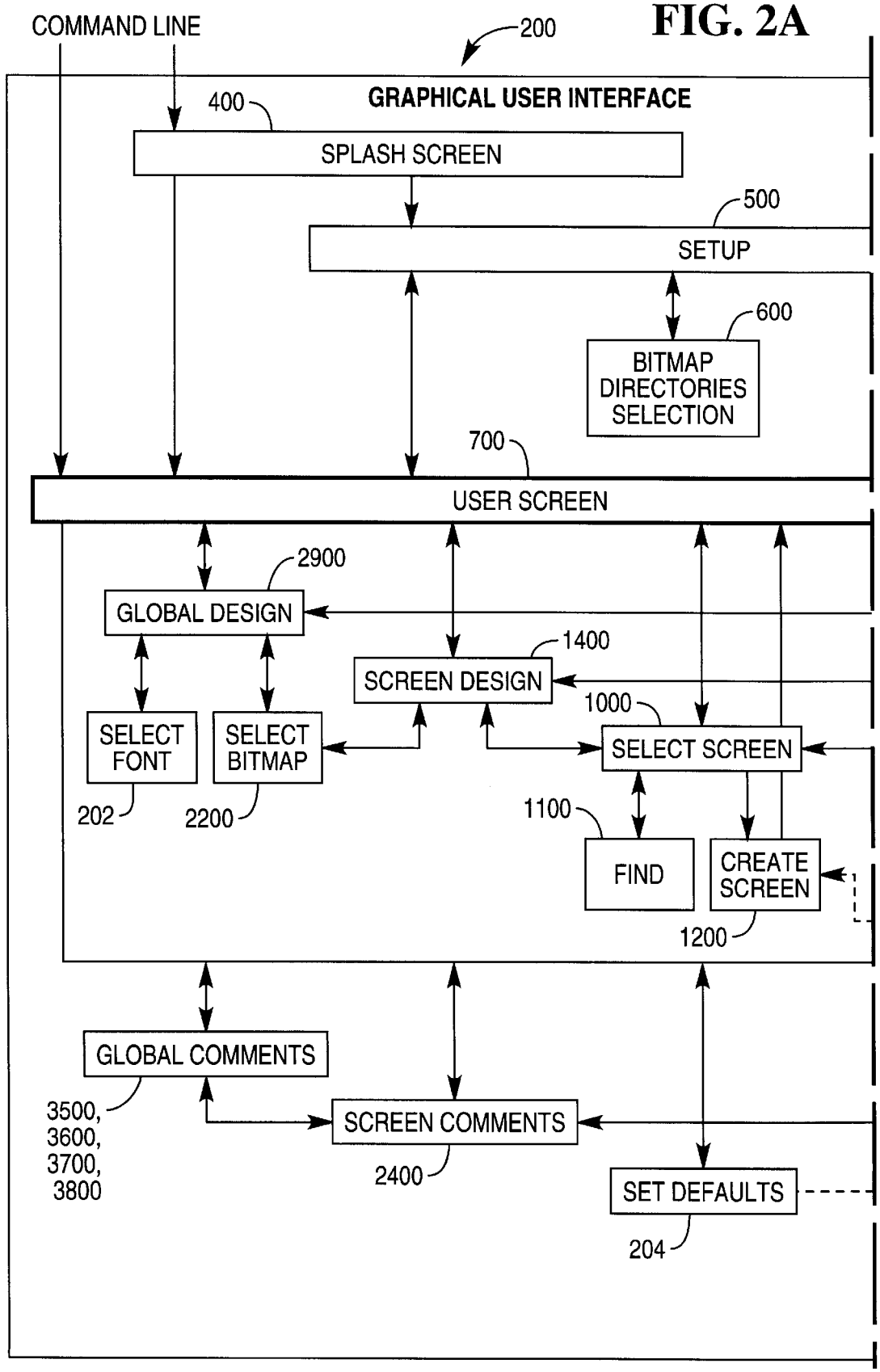
FIGS. 2A and 2B are a logical architecture of the software according to the present invention.
Figure 2B:
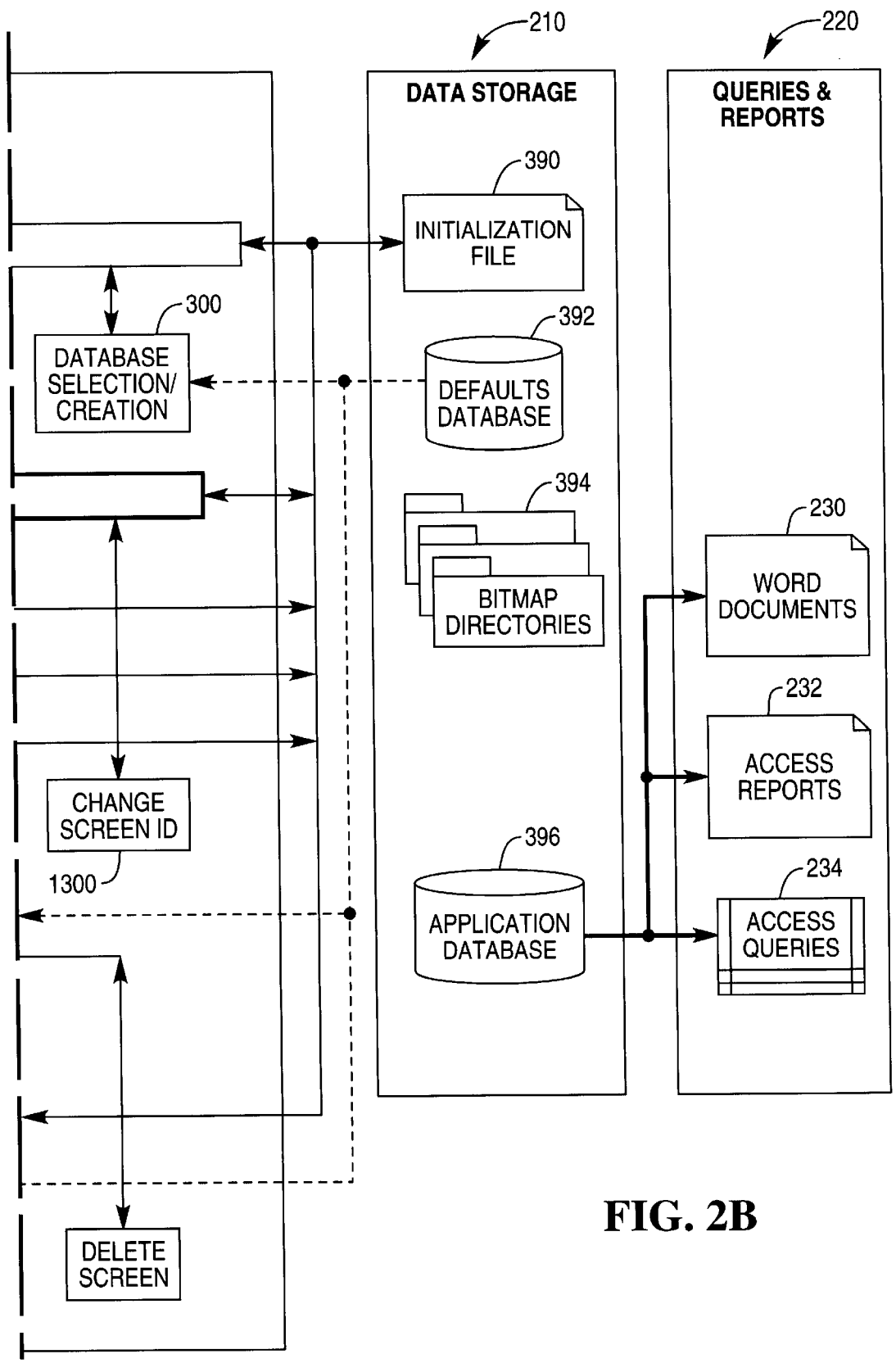

A prototyping and specification graphical user interface according to the present invention is preferably provided by a Microsoft Visual Basic application to a Microsoft Access database. The prototyping and specification graphical user interface allows for the entry of the user interface specifications for the application being prototyped/specified and for interactive "running" of the target application's user interface. A logical architecture of the present invention is depicted in FIG. 2. The logical architecture includes a graphical user interface 100 coupled to data storage 210 which in turn is coupled to a queries and reports generator 220.

The prototyping and specification tool main window (the "user screen" or "target application"), dialog boxes and buttons are summarized as follows:

Database Selection/Creation screen 300 allows the user to select an existing database to open or to create a new database. (Standard Windows Open dialog box).

Splash screen 400 shows title and copyright information and provides access to the prototyping and specification graphical user interface.

Setup screen dialog box screen 500 allows the user to open an existing database, create a new database, and designate the locations of bitmap director folders.

Bitmap Directories Selection screen 600 allows the user to designate a folder that contains a particular type of bitmap (the type that is highlighted in the Setup dialog box screen 500) used by the application.

User Screen 700 displays and allows interaction with the current screen in the application being prototyped/ specified (hereafter called the "target" application). It also displays the target application's static keys, an optional weight slider, screen information (which can be turned on or off), and a control bar for accessing supplemental dialog boxes.

Delete Screen button 764 opens a delete confirmation dialog box for deleting the current (user) screen, as well as all Dynakey and static-key links to it.

Select Screen dialog box 1000, when accessed from the user screen 700, allows selection of a screen to view. When accessed from the Screen Design dialog box 1400, allows selection of a screen that a pick-list item, Dynakey, or static key will navigate to. Also allows for the creation of a new screen.

Find dialog box 1100 allows the user to search the screen list in the Screen Selection Dialog Box for a screen ID, screen name, title, prompt, or message.

Create Screen dialog box 1200 allows the user to enter the name of a screen being created and choose whether the new screen is a copy of the default screen or the current screen.

Change Screen ID dialog box 1300 allows the user to change the ID of the current screen. Changing the ID of a screen that has navigational links to it will change all the links to the new screen ID.

Screen Design dialog box 1400 allows the user to author the current screen.

Select Bitmap 2200 allows selection of a bitmap for use as a screen background, screen corner, Dynakey background or foreground, display-area background, or status icon.

Global Comments 3500, 3600, 3700, 3800 displays properties set in the Global Design Dialog box 2900 and allows entry of comments.

Screen Comments 2400 displays the properties of each area of the current screen and allows entry of comments.

Global Design Box 2900 allows the user to label the static keys, select status icon bitmaps and set visual properties for different areas of the user screen.

Select Font 202 allows selection of font properties for each area of the user interface. (Standard Windows Font dialog box).

Set Defaults 204 stores the current screen and global design settings in a defaults database 392; the defaults are used when creating a new database or new screen.

As depicted in FIG. 2, the data storage 210 includes the initialization file 390 which stores user-specific application settings (e.g., last-used database, bitmap directory locations, default dialog-box tabs), a defaults database 392 that stores designated global design settings and settings for a single (author-selected) screen. When the user creates a new application database, that database is a copy of the defaults database 392, and contains a single screen. When the user creates a new screen in an application and opts to use the "default" screen, that screen is a copy of the screen in the defaults database 392. The data storage 210 includes bitmap directories 394 which store bitmaps that are available for use in the target application's user interface. Different directories store bitmaps for different areas of the user interface (screen backgrounds, corners, dynakeys, dynakey backgrounds, electronic-receipt-area background and status). The data storage 210 also includes an application database 396 that stores the user interface specification for a target application.

As depicted in FIG. 2, Queries and Reports can be generated using Word Documents 230 query. Microsoft Word (or other word-processing tools with similar capabilities) can be used to link to data in a data storage 210 and present the user interface specifications in a document format. Report tools in Microsoft Access 232 can also be used to present the user interface specifications in a document format. Query tools in Microsoft Access 234 can be used to perform ad hoc queries on the data in the data storage 210.

Figure 3:
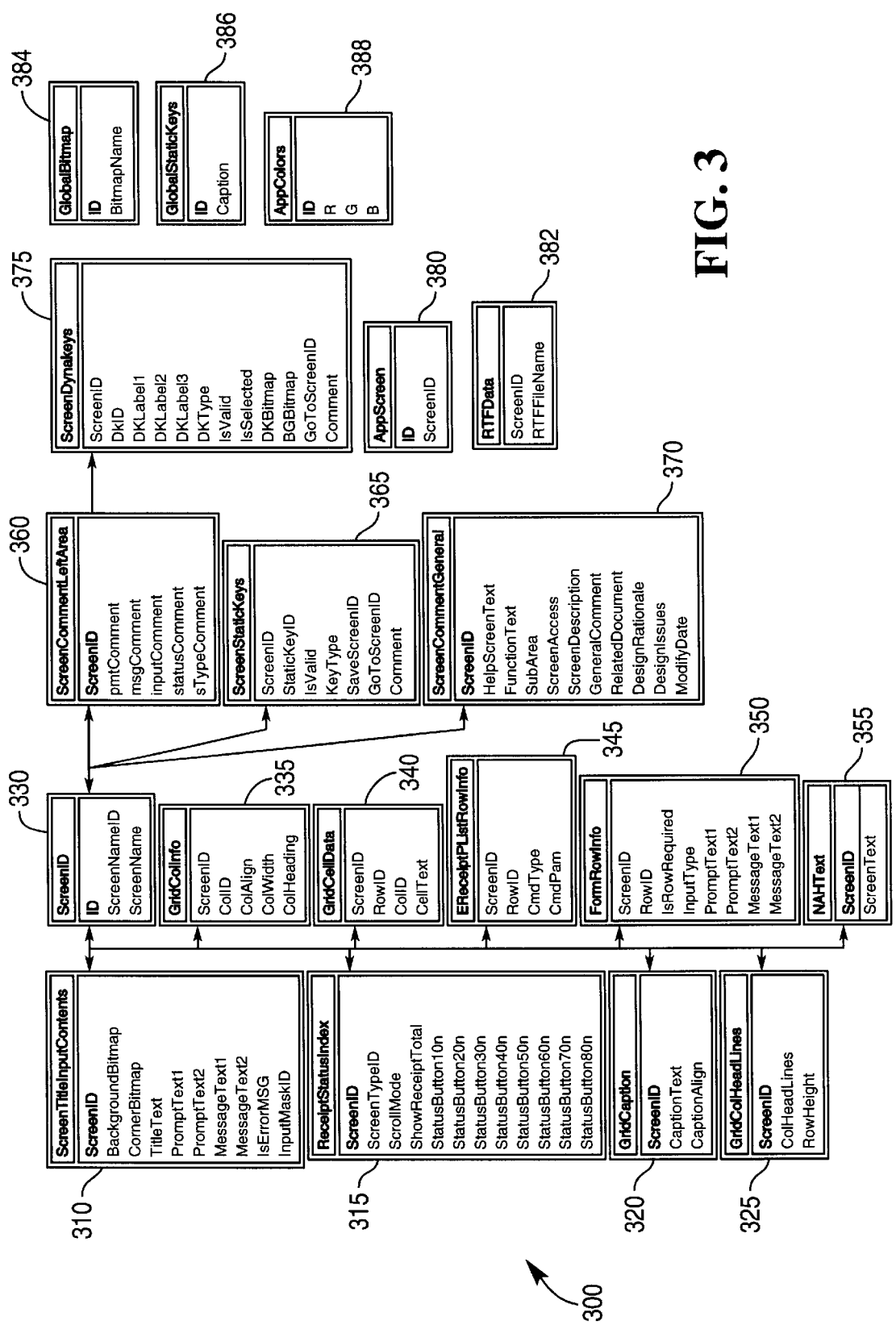
FIG. 3 is a view of database tables according to the present invention.

A database structure 100 is depicted in FIG. 3. The database structure 100 includes a ScreenTitleInputContents table 310, a ReceiptStatusIndex table 315, a GridCaption table 320, a GridColHeadLines table 325, a Screen ID table 330, a GridColInfo table 335, a GridCellData table 340, an EReceipt PListRowInfo table 345, a FormRowInfo table 350, an NAHText table 355, a ScreenCommentLeftArea table 360, a ScreenStaticKeys table 365, a ScreenComment General table 370, a ScreenDynakeys table 375, a AppScreen 380, an RTFData table 382, a GlobalBitmap table 384, a GlobalStaticKeys table 386, and an AppColors table 388. Tables 310, 315, 320, 325, 330, 335, 340, 345, 350 and 355 are related to each other in a one-to-one relationship. Table 330 is related to tables 360, 365 and 370 also on a one-to-one relationship. Table 360 is related to table 375 in a one-to-one relationship. Tables 380, 382, 384, 386 and 388 are not related to other tables in the database structure 100.

Figure 4:
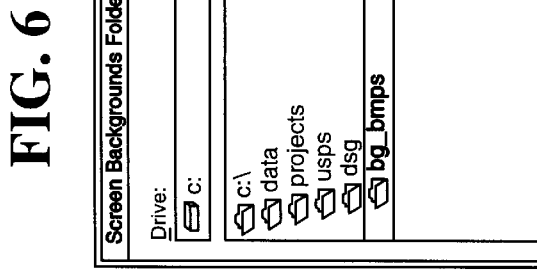
FIG. 4 is a view of a splash screen.

The prototyping and specification tool of the present invention is run by executing DSG.exe with no command-line arguments which opens a Splash screen 400 depicted in FIG. 4 providing access to a Setup dialog button 420 (FIG. 4) or, if an initialization file contains valid database and bitmap directory information, to the User screen 700.

Command-line arguments can also be provided to open the prototyping and specification tool to a specified screen in a specified database. The form of the command is: DSG "Database" "ScreenID" where Database includes the entire database path and database file name and Screen ID is the ID of the screen in the database to open. If the database resides in a Data directory under the directory where the prototyping and specification tool is installed, the path may be omitted. Double quotes are required if either of the arguments if the argument contains spaces. The initialization file 390 stores user-specific application settings. This initialization file 390 contains three sections:

A Bitmap Path section stores the directory locations of the bit map files that were last used.

An Application section stores the default tab for the Global Design 2900, Screen Design 1400, Screen Comments 2400, and Screen Selection 1000 dialog boxes; whether screen information was displayed on the User screen 700 the last time exited; and the last-used database.

A Select Screen section stores the user-set widths of the column in the Screen Selection dialog box 1000.

The Splash screen 400 depicted in FIG. 4 shows title and copyright information and provides access to the prototyping and specification tool. As previously mentioned, the Splash screen 400 opens when DSG.exe is run without command-line arguments. The run button 410 opens the prototyping tool using the settings (database, bitmap folder locations) in the prototyping tools initialization file 390, which were written to the file the last time the prototyping tool was run. The run button 410 is disabled if the initialization file does not contain valid settings (i.e., this is the first time the user has run DSG, or files have been moved from their original locations). The setup button 420 opens the setup dialog box screen 500 (FIG. 5) in which the user can open an existing database, create a new database, and designate the locations of bitmap directory folders. The exit button 430 exits the prototyping tool.

Figure 5:
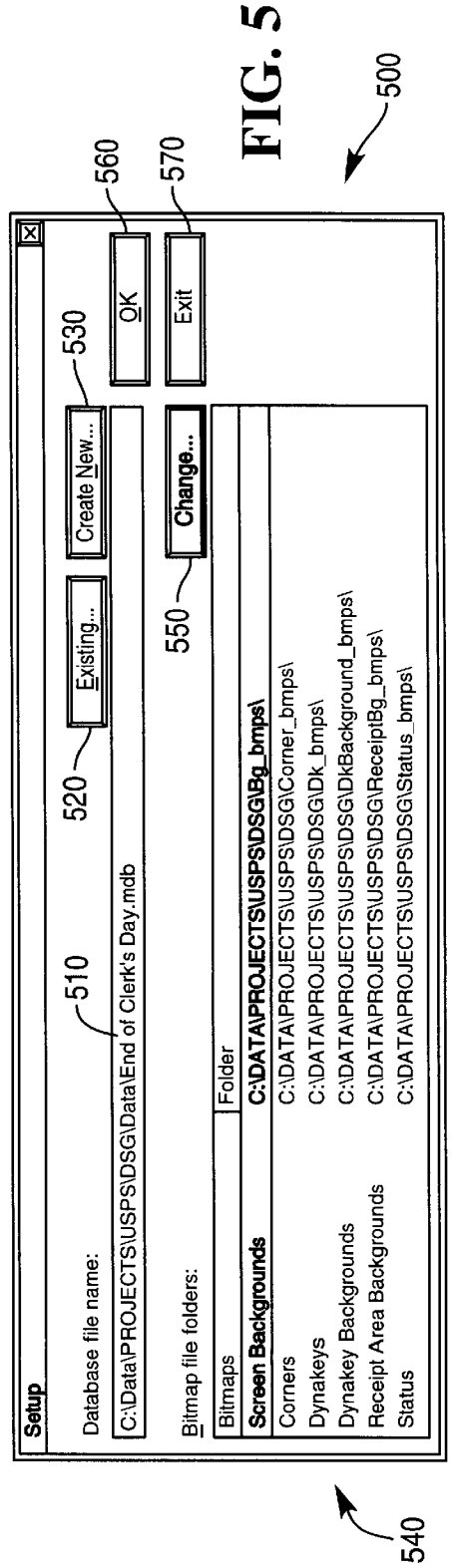
FIG. 5, is a view of a set up dialog box.

The setup dialog box screen 500 depicted in FIG. 5 allows the user to open an existing database, create a new database, and designate the locations of bitmap directory folders. The setup dialog box 500 opens when the setup button 420, 756 on either the splash screen 400 or the user screen 700 is selected, respectively. A database file name area 510 shows the current database file name. A select existing button 520 opens a standard "Open" Windows dialog box (not shown) which allows the user to select an existing database to view or author. Selecting a create new button 530 opens the standard "Open" Windows dialog box, which allows the user to specify the name of a new database to author. A bitmap file folder area 540 shows the current folder for each type of bitmap used by the prototyping tool. Selecting a change button 550 opens a bitmap folder dialog box (FIG. 6) which allows the user to specify the folder that contains the selected type of bitmap to be used by the prototyping tool. Selecting an OK button 560 accepts the user's entries. When setup dialog box screen 500 has been opened from the splash screen 400, this dialog box closes and the user screen 700 opens (FIG. 7). When this dialog box 500 has been opened from the user screen 700, this dialog box 500 closes and the settings take affect. Selecting an exit/cancel button 570 labeled "Exit" when this dialog box 500 has been opened from the splash screen 400 exits the application. Labeled "Cancel" when this dialog box has been opened from the user screen, selection closes the dialog box without performing any actions.

Figure 6:
FIG. 6 is a view of a bit map folder dialog box.
Figure 7:
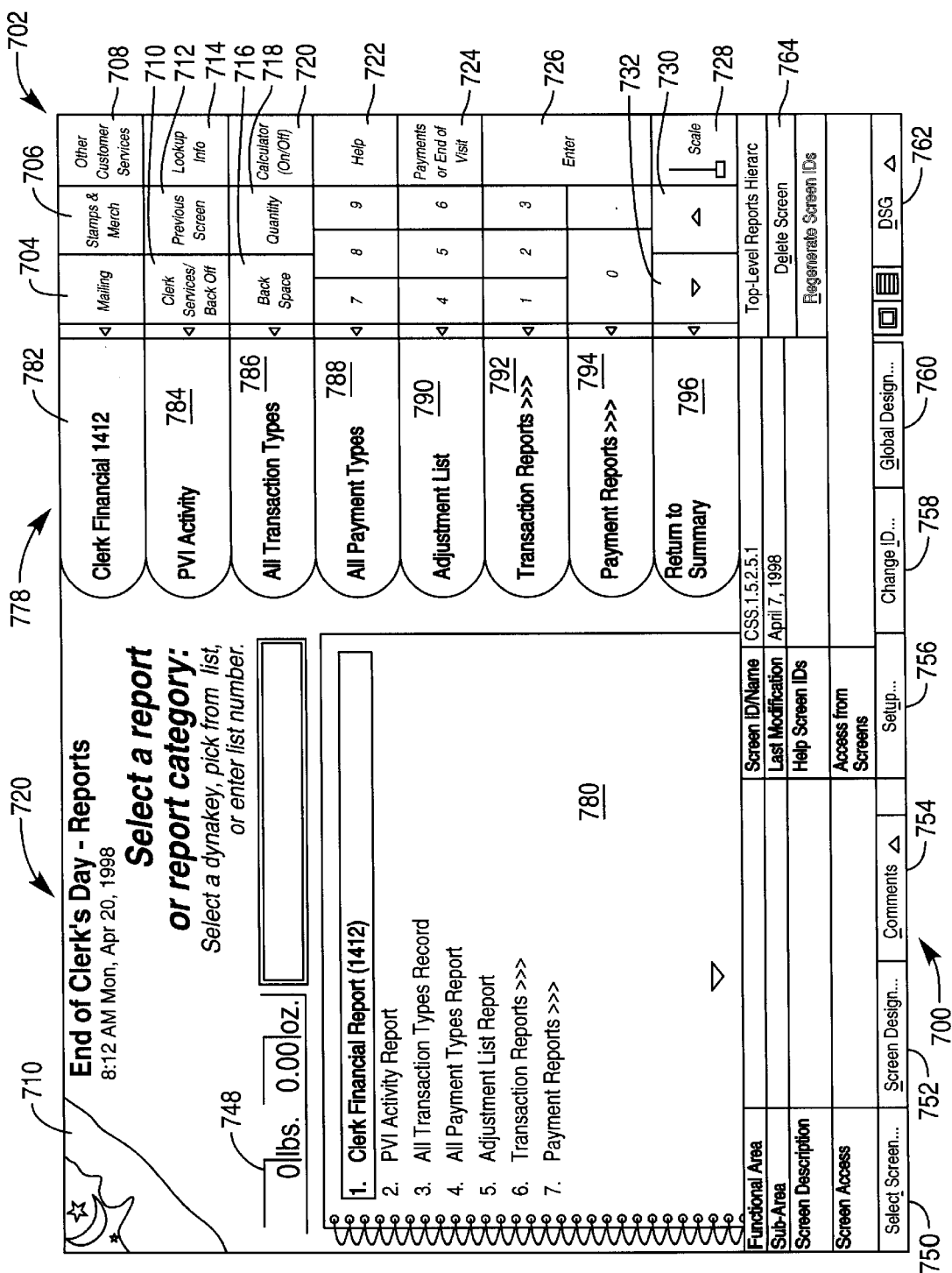
FIG. 7 is a view of a user screen.

The bitmap folder dialog box screen 600 depicted in FIG. 6 allows the user to designate the folder that contains a particular type of bitmap (the type that is highlighted in the setup dialog box screen 500) used by the prototyping tool. The bitmap folder dialog box 600 opens when the change button 550 is selected in the setup dialog box screen 500 or an item in the setup dialog's bitmap file folders list 540 is double clicked. A drive dropdown list 620 allows selection of the disk drive that contains the bitmap folder. An OK button 630 selection accepts the user's entries, closes the dialog box 600, and displays the folder path and name in the bitmap file folders list 540 in the setup dialog box screen 500. A cancel button 640 selection closes the dialog box 600 without performing any actions. A user screen 700 depicted in FIG. 7 displays and allows interaction with the current screen in the prototyping tool being prototyped/specified (hereafter called the "target" application). The user screen 700 displays the target application's static keys, an optional weight slider, screen information (which can be turned on or off), and a control bar for accessing supplemental dialog boxes.

As depicted in FIG. 7, the target application or user screen 700 includes many areas, each of which is specified in the database structure 300. As depicted in FIG. 7, a pick list is displayed in the display area 780. The background is specified as a field in the ScreenTitleInputContents table 310. The background is a 640×480 bitmap, which can vary from screen to screen in the target application. A corner graphic 710 is an optional bitmap in the upper-left corner in the target application. A screen title 720 is provided which as depicted in FIG. 7 is End of Clerk's Day-Reports. A one or two line user prompt is provided. The prompt is dynamic when the form contains a form; the content varies according to the form field that is highlighted. The prompt is static for other display-area types. A one or two line supplemental message is provided. An optional pounds and ounces display 748 is depicted which is controlled via a weight slider 728. A user input area 702 accepts user input from an alphanumeric keyboard (not shown), a numeric keypad in the static key area, and a backspace keyboard or static key. The behavior of the user input area 702 depends on the type of control in display area (e.g., form, pick list, electronic receipt, prompt). A display area 780 presents the target application's information. The following controls can be displayed in this area:

Form

Pick list

Electronic receipt

Notification

Alert

Help

Freeform (rich text)

The sample layout depicted in FIG. 7 shows a pick list in the display area 780. A set of eight dynamic keys 782, 784, 786, 788, 790, 792, 794, 796 can be dynamically configured. Each dynamic key includes the following components:

Background graphic

One to three-line label

Foreground graphic

Graphical representation of the physical Dynakey button

Any of the eight Dynakeys can be present or absent in a particular screen in the target application. If present, a selectable background graphic is displayed; an optional label is displayed; and an optional foreground graphic is displayed. Each dynamic key 782–796 can be selected by clicking an input device on any dynamic key 782–796 component or by pressing keyboard function keys F1 through F8, which are mapped onto the dynamic keys 1 through 8. Selecting a dynamic key can navigate to a different screen or provide input into a form in the display area 780.

Physical static keys are graphically represented. The label and function of 13 labeled keys 704, 706, 708, 710, 712, 714, 716, 718, 720, 722, 724, 726, 728, 730, 732 is controllable. Selecting one of these keys can navigate to a different screen, backspace the user input area, or perform Enter and Quantity functions, which depend on the type of control in display area. The static key area also includes the numeric keypad and up/down scroll keys, which perform either line or page scrolling of the display area.

A plurality of buttons includes a select screen button 750, the selection of which opens the screen selection dialog box 1000 (FIG. 10); a screen design button 752, the selection of which opens the screen design dialog box 1400; and a comments button 754, the selection of which displays a menu including screen comments and global comments. Screen comments opens a screen comments dialog box 2400. Selecting global comments opens a global comments dialog box 3500. Selecting a setup button 756 opens the setup dialog box 500. Selecting a change ID button 758 opens the change screen ID dialog box 1300. Selecting a global design button 760 opens the global design dialog box 2900. Selecting a DSG button 762 displays a menu including: UI Style Guide selection opens a Microsoft Word file containing a user interface style guide for the target application. Show Data selection toggles the display (on/off) of everything below the target application screen and static keys except the DSG button 762. Set Defaults opens a prompt box asking the user whether she/he wants the current screen and global design settings to be the defaults when creating a new database or new screen. If so, the current screen and global design settings are written to a separate database (Blank.dsg). When the user creates a new database in the Setup dialog box 500, that database is a copy of Blank.dsg, and contains a single screen. When the user creates a new screen (in any database) and opts to use the "default" screen, that screen is a copy of the screen in Blank.dsg; minimize minimizes the prototyping and specification graphical user interface window. Exit opens a prompt box asking whether the user wants to exit the prototyping and specification graphical user interface. If so, the application closes.

Selecting a Delete Screen button 764 opens a prompt box asking the user whether user wants to delete the current screen. If so, the screen is deleted from the database and all navigational links from other screens to the deleted screen are cleared in the database. This button 764 is disabled if the current screen is the only screen in the database.

Figure 8:
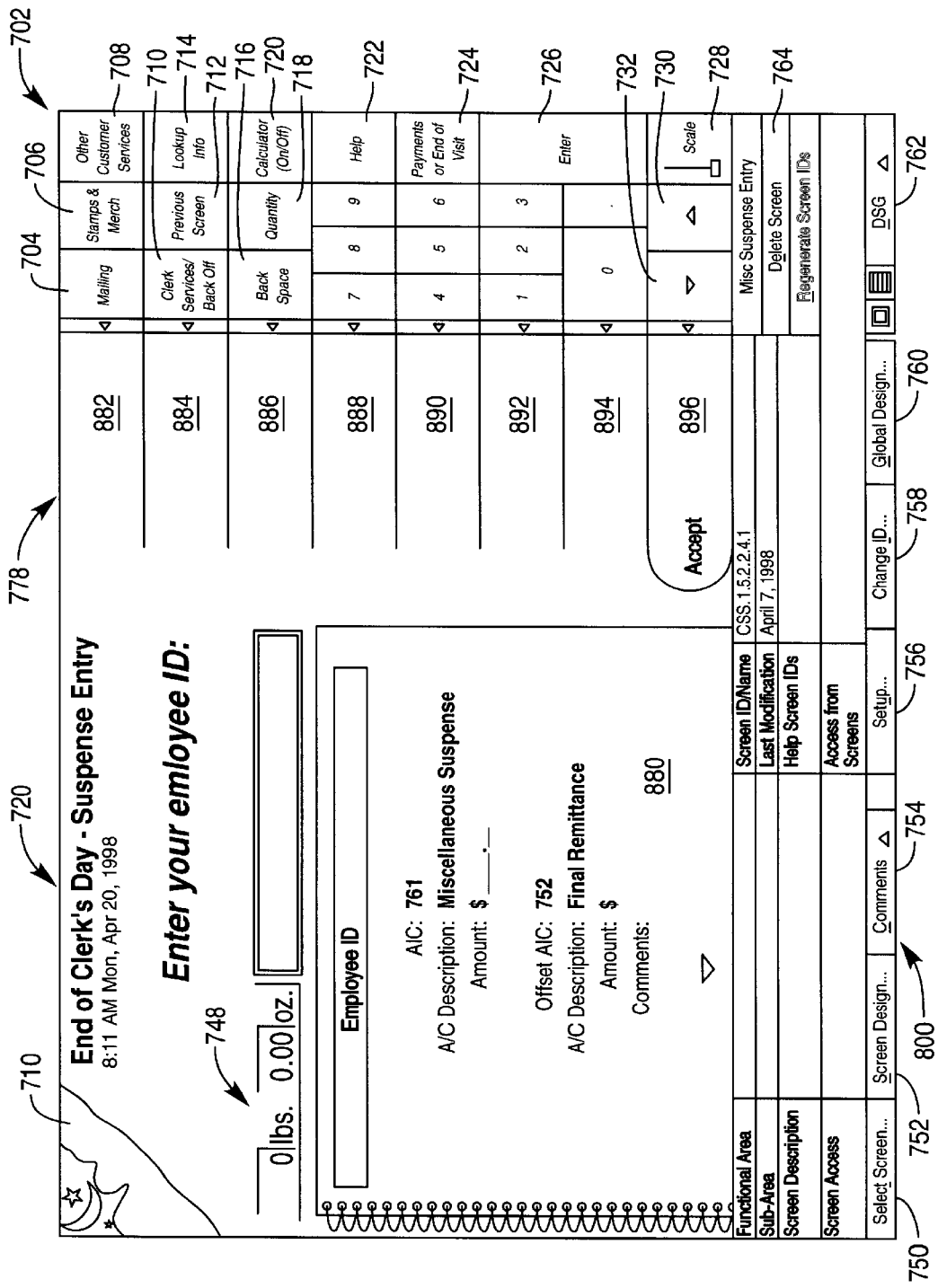
FIG. 8 is a view of a form in the user screen.
Figure 9:
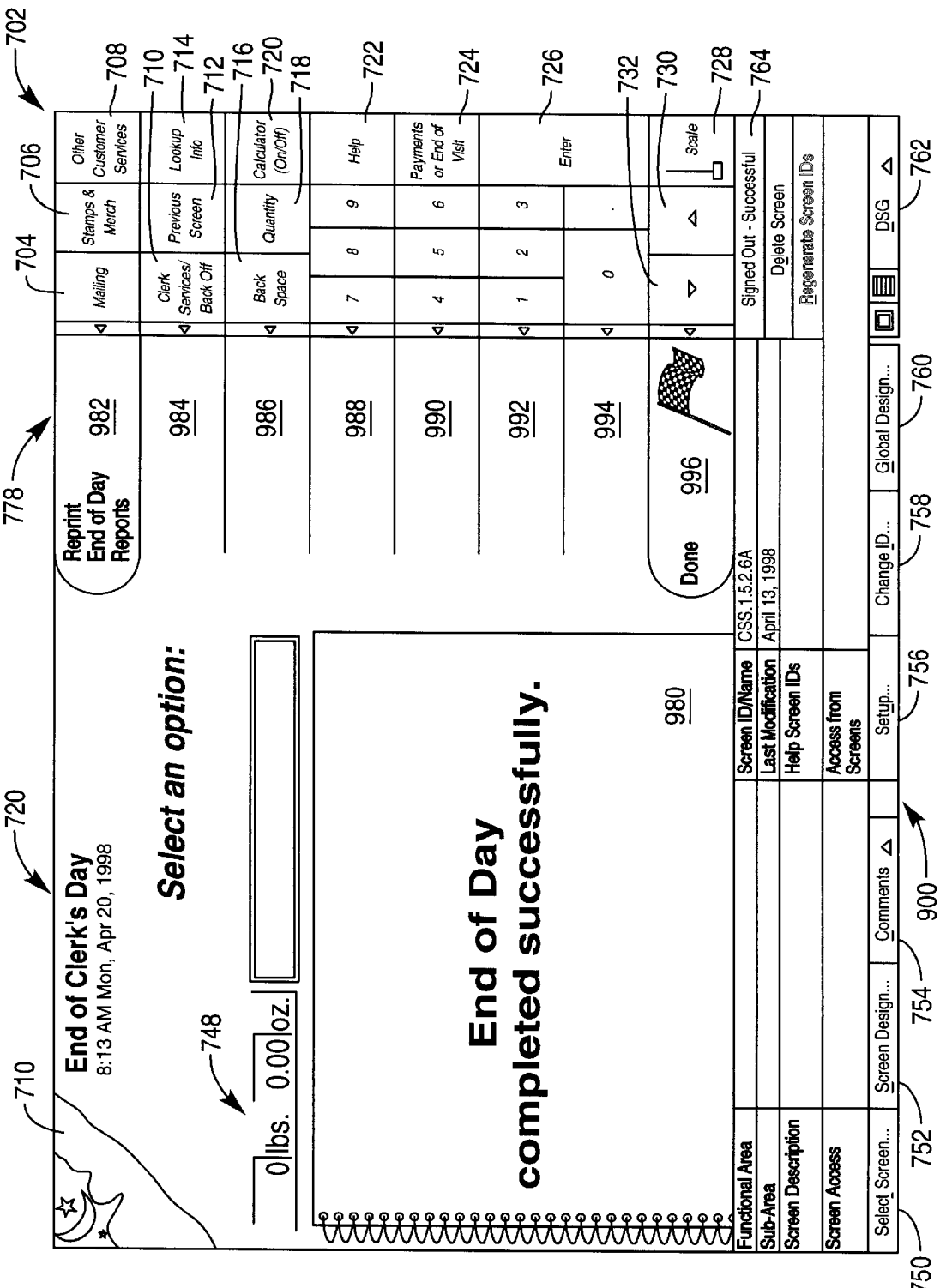
FIG. 9 is a view of a notification in the user screen.

As depicted in FIG. 8, a form is depicted in display area 880. There are also eight dynamic keys 882–896 which are configured for use with the form. As depicted in FIG. 9, a notification is depicted in display area 980. There are also eight dynamic keys 982–996 which are configured for used with the notification. The display area can also be used to display electronic receipts, alerts, help, or freeform (rich text).

Figure 10:
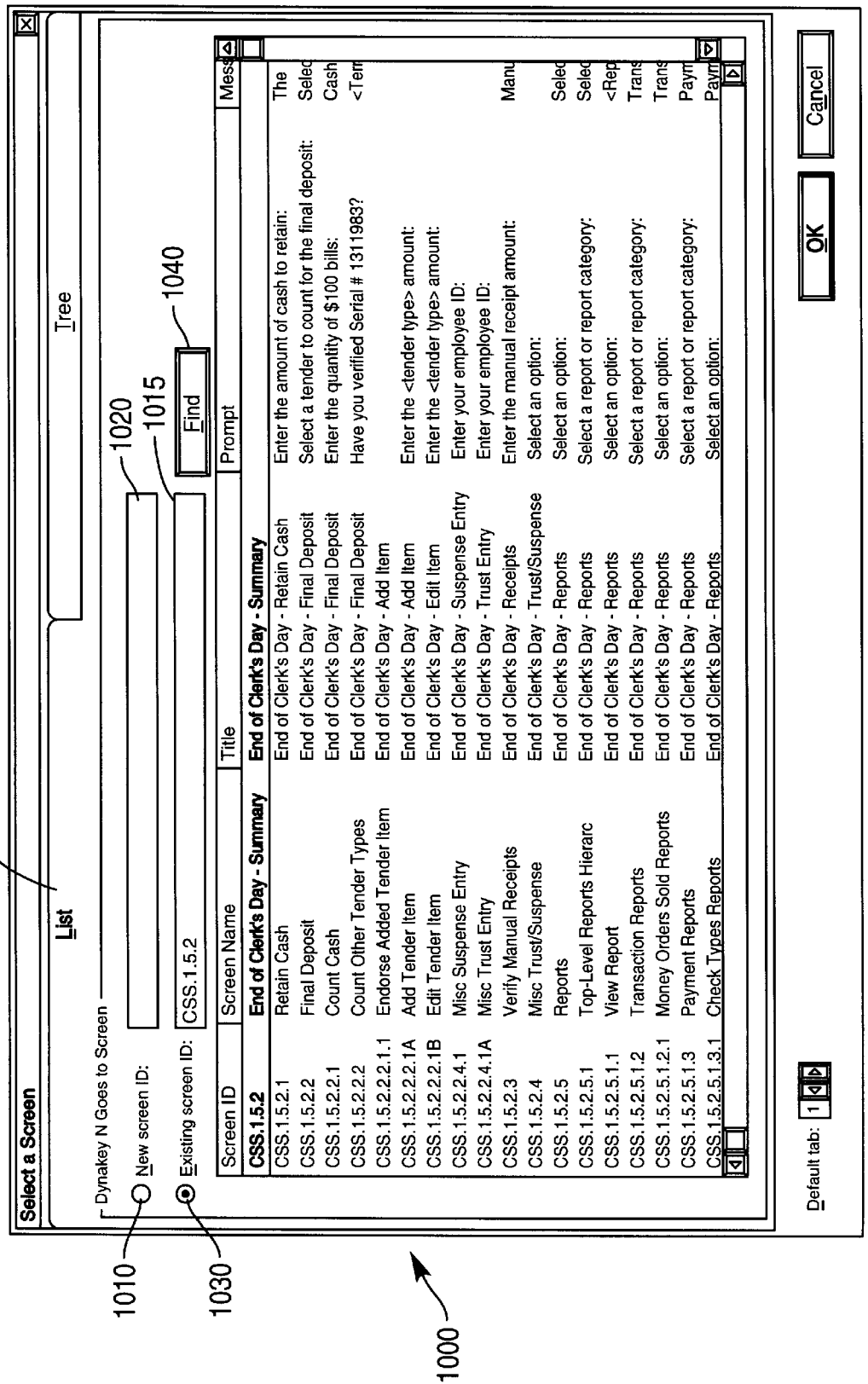
FIG. 10 is a view of a screen selection dialog box.

A Screen Selection Dialog Box 1000 is depicted in FIG. 10. When accessed from the user screen 700, the Screen Selection Dialog Box 1000 allows selection of a screen to view. When accessed from the Screen Design Dialog Box 1400, it allows selection of a screen that a pick-list item, Dynakey, or static key will navigate to. It also allows for the creation of a new screen.

The Screen Selection Dialog Box 1000 opens when the Select Screen Button 750 is selected on the user screen 700, or a Go To button is selected on the Receipt & Status Area, dynamic keys, or Static Keys tabs in the Screen Design Dialog Box 1400. Selecting a New Screen ID Radio Button 1010 clears the Existing Screen ID Text Box 1015 and screen-list highlighting, and sets input focus to the New Screen ID Text Box 1020. A New Screen ID Text Box 1020 allows entry of a new screen ID. Selection of the New Screen ID Text Box 1020 selects the New Screen ID Radio Button 1010. Selecting an Existing Screen ID Radio Button 1030 clears the New Screen ID Text Box 1020 and sets input focus to the Existing Screen ID Text Box 1015. The Existing Screen ID Text Box 1015 allows entry of an existing screen ID. As the ID is entered, the first matching ID in the screen list is highlighted. A highlighted record in the display area or Existing Screen ID Radio Button 1030 shows the ID of the selected ID in the screen list. Selection of the highlighted record selects the Existing Screen ID Radio Button 1030.

A Screen List 1050 lists the screens in the database and allows selection. Double-clicking a screen selects it and performs the OK-button function. The resizable-column widths are saved in the initialization file 390. Selecting a Find Button 1040 opens the Find Dialog Box 1100 (FIG. 11), which allows the user to search for a screen by screen ID, screen name, title, prompt or message. If this dialog box was accessed from the user screen 700, selecting the OK button closes this dialog box and displays the selected screen. If this dialog box 1100 was accessed from a Go To button on the Receipt & Status Area, Dynakeys, or Static Keys tabs in the Screen Design Dialog Box 1000, selecting the OK button closes this dialog box and displays the selected screen ID in the Go To field.

If a new screen ID has been entered, selecting the OK button results in a search of the screen list to determine whether the entered screen ID is in fact new. If a match is found (the entered screen ID is not new), a message box opens, explaining that the screen already exists and prompting whether to display it or have the pick-list item, Dynakey, or static key navigate to it. If a match is not found (the entered screen ID is new), opens a prompt box asking whether the user would like to create the screen. If the response is Yes, opens a Create Screen Dialog Box 1200.

Figure 11:
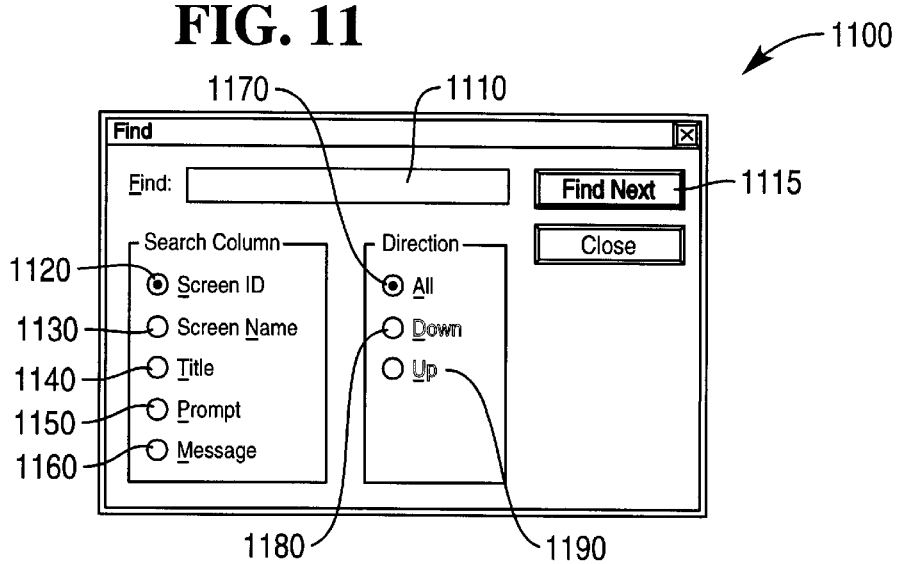
FIG. 11 is a view of a find dialog box.

Selecting a Cancel Button closes the dialog box without performing any actions. A Find Dialog Box 1100 is depicted in FIG. 11 which allows the user to search the screen list in the Screen Selection Dialog Box 1000 for a screen ID screen name, title, prompt or message. The Find Dialog Box 1100 opens when the Find button is selected in the Screen Selection Dialog Box 1000.

A Find text box 1110 allows entry of a search string. Selecting a Screen ID Radio Button 1120 results in a search for a matching screen ID in the screen list in the Screen Selection Dialog Box when the Find Next button is selected or the radio button is double-clicked. Selecting a Screen Name Radio Button 1130 results in a search for a matching screen name in the screen list 1050 in the Screen Selection Dialog Box 1000 when a Find Next Button 1115 is selected or the radio button 1120 is double-clicked. Selecting a Title Radio Button 1140 results in a search for a matching screen title in the screen list 1050 in the Screen Selection Dialog Box 1000 when the Find Next Button 1115 is selected or the Title Radio Button 1140 is double-clicked. Selecting a Prompt Radio Button 1150 results in a search for a matching screen prompt in the screen list 1050 in the Screen Selection Dialog Box 1000 when the Find Next Button 1115 is selected or the Title Radio Button 1140 is double-clicked. Selecting a Message Radio Button 1160 results in a search for a matching screen message in the screen list 1050 in the Screen Selection Dialog Box 1000 when the Find Next Button 1115 is selected or the Selecting a Message Radio Button 1160 is double-clicked. Selecting an All Radio Button 1170 results in a search of the entire screen list 1050 in the Screen Selection Dialog Box 1000 when the Find Next Button 1115 is selected or the radio button 1170 is double-clicked. Selecting a Down Radio Button 1180 results in a search of the screen list 1050 in the Screen Selection Dialog Box 1000 from the currently-highlighted screen to the end when the Find Next Button 1115 is selected or the Down Radio Button 1180 is double-clicked. Selecting an Up Radio Button 1190 results in a search of the screen list 1050 in the Screen Selection Dialog Box 1000 from the currently highlighted screen to the beginning when the Find Next Button 1115 is selected or the Up Radio Button 1190 is double clicked. Selecting a Find Next Button 1115 performs the search of the Find Text according to the radio-button settings.

Figure 12:
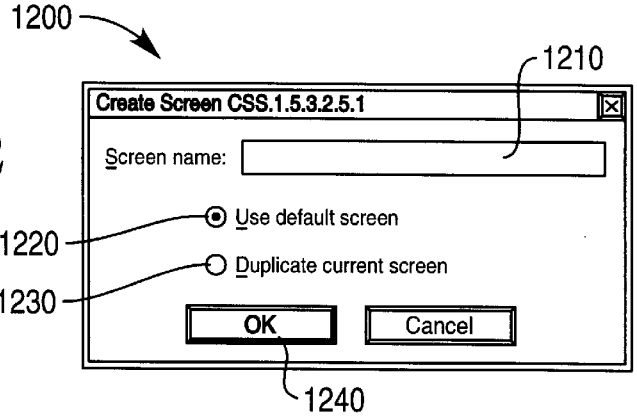
FIG. 12 is a view of a create screen dialog box.

A Create Screen Dialog Box 1200 is depicted in FIG. 12 which allows the user to enter the name of a screen being created and choose whether the new screen is a copy of the default screen or the current screen. The Create Screen Dialog Box 1200 opens when a new screen ID has been entered in the Screen Selection Dialog Box 1000, the OK button in that dialog box is selected, and the user confirms that she/he wants to create the new screen. A Screen Name Text Box 1210 allows entry of a screen name. Selecting a Use Default Screen Radio Button 1220 results in the creation of a copy of the default screen when the OK button is selected or the Radio Button 1220 is double-clicked. Selecting an OK Button 1240 closes the dialog box and creates the new screen. If the Screen Selection Dialog Box 1000 was accessed from the user screen, the new screen is displayed. If it was accessed from the Screen Design Dialog Box 1000 the ID of the new screen is displayed in the Go To field.

Figure 13:
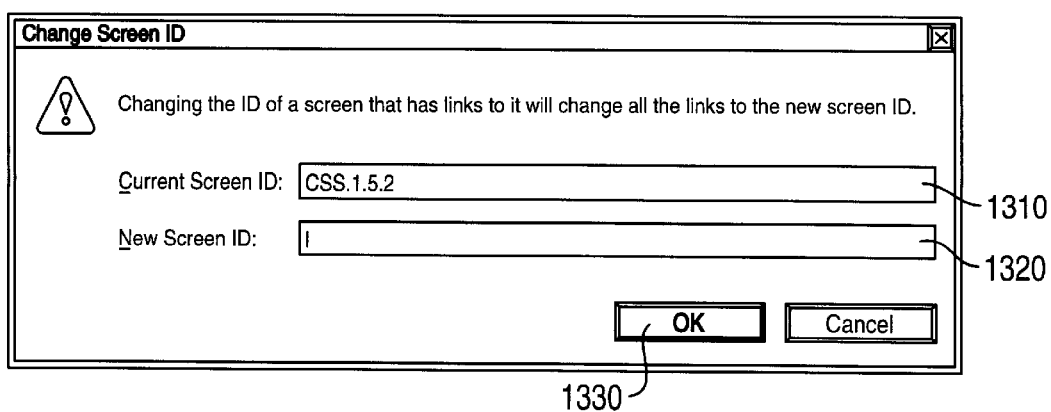
FIG. 13 is a view of a change screen ID dialog box.

A Change Screen ID Dialog Box 1300 is depicted in FIG. 13 which allows the user to change the ID of the current screen. Changing the ID of a screen that has navigational links to it will change all the links to the new screen ID. The Change Screen ID Dialog Box 1300 opens when the Change ID Button 758 on the user screen 700 is selected. The Current Screen ID Text Box 1310 displays the ID of the current screen (read-only). A New Screen ID Text Box 1320 allows entry of a new screen ID. Selecting an OK button 1330 closes the dialog box 1300, changes the current screen's ID, and changes all the navigational links to the screen from the old ID to the new ID.

Figure 14:
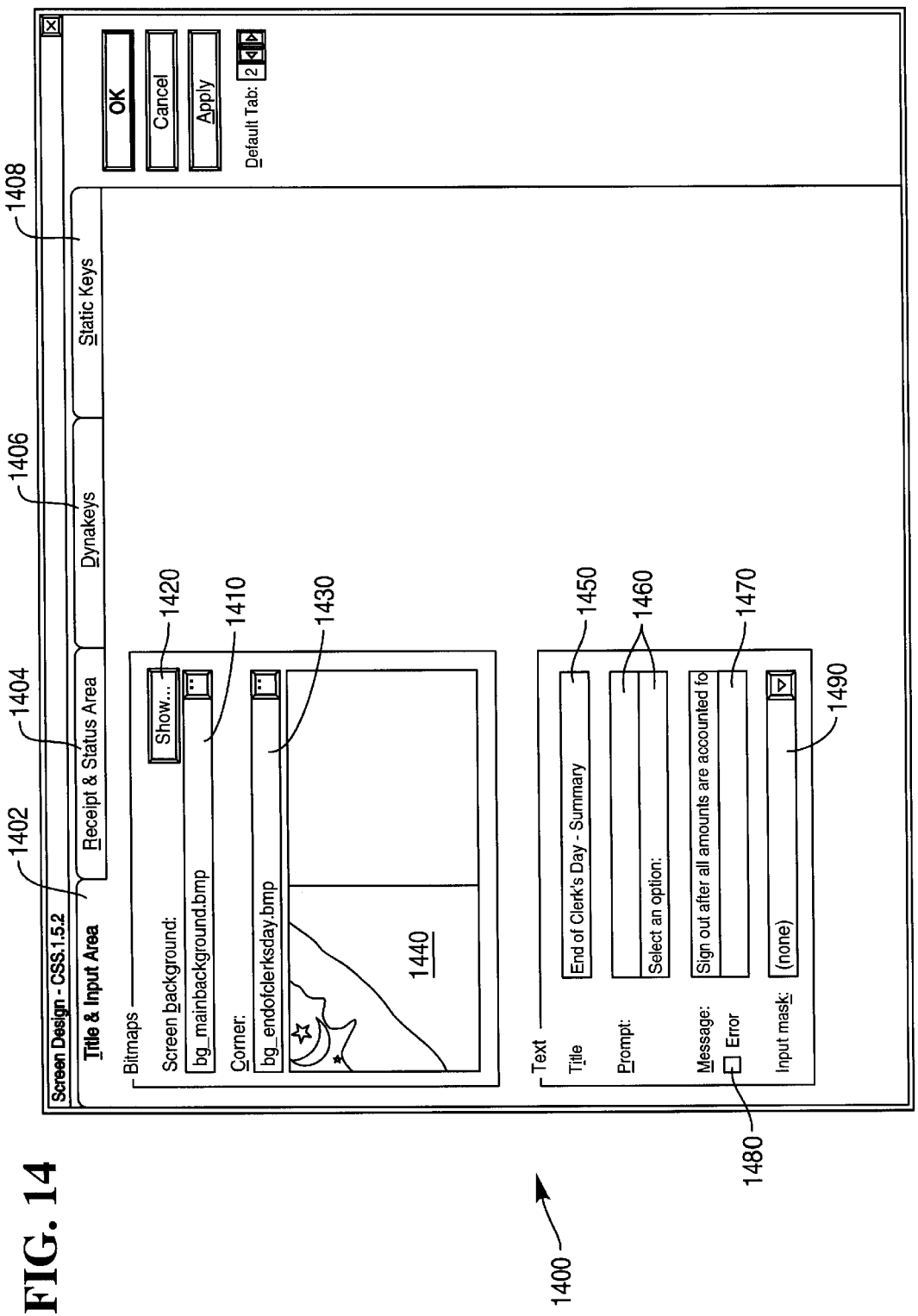
FIG. 14 is view of a screen design dialog box.

A Screen Design Dialog Box 1400 is depicted in FIG. 14 which allows the user to author the current screen. The Screen Design Dialog Box 1400 opens when the Screen Design Button 752 on the user screen is selected. Selecting the Screen Design Button 752 displays FIG. 14 which is the Title and Input Area Tab 1402. A Receipt and Status Area Tab 1404, a Dynakeys Tab 1406 and a Static Keys Tab 1408 are also selectable. A Screen Background Text Box 1410 displays the name of the file that contains the screen background bitmap (read-only). Selecting this text box or the button in it opens the Bitmap Selection Dialog Box 600. This bitmap file defaults to that set in the Global Design Dialog Box 2900. Selecting a Show Button 1420 opens the Screen Background Dialog Box 1410 which displays the screen background bitmap 600. A Corner Text Box 1430 displays the name of the file that contains the screen-corner bitmap (read-only). Selecting the Corner Text Box 1430 or the button in it opens the Bitmap Selection Dialog Box. A Graphic Area 1440 shows the corner bitmap. A Title Text Box 1450 allows entry of the screen title. A Prompt Text Box 1460 allows entry of a one or two line screen prompt. If the display area of the screen contains a form, the form fields' prompts override this prompt. A Message Text Box 1470 allows entry of a one or two line screen message. If the display area of the screen contains a form, the form fields' messages override this prompt. An Error Check Box 1480 allows designation of whether the message is an error message. If so, the message will be displayed in the error message color specified in the Global Design Dialog Box 2900. An Input Mask Dropdown Combo Box 1490 allows entry or selection of an input mask for the input area of the user screen. Application-provided input masks are ##/##/#### (date), $9,999,999.99 (currency), 9#lb. 99.##oz. (weight), and ####9999 (integer).

Figure 15:
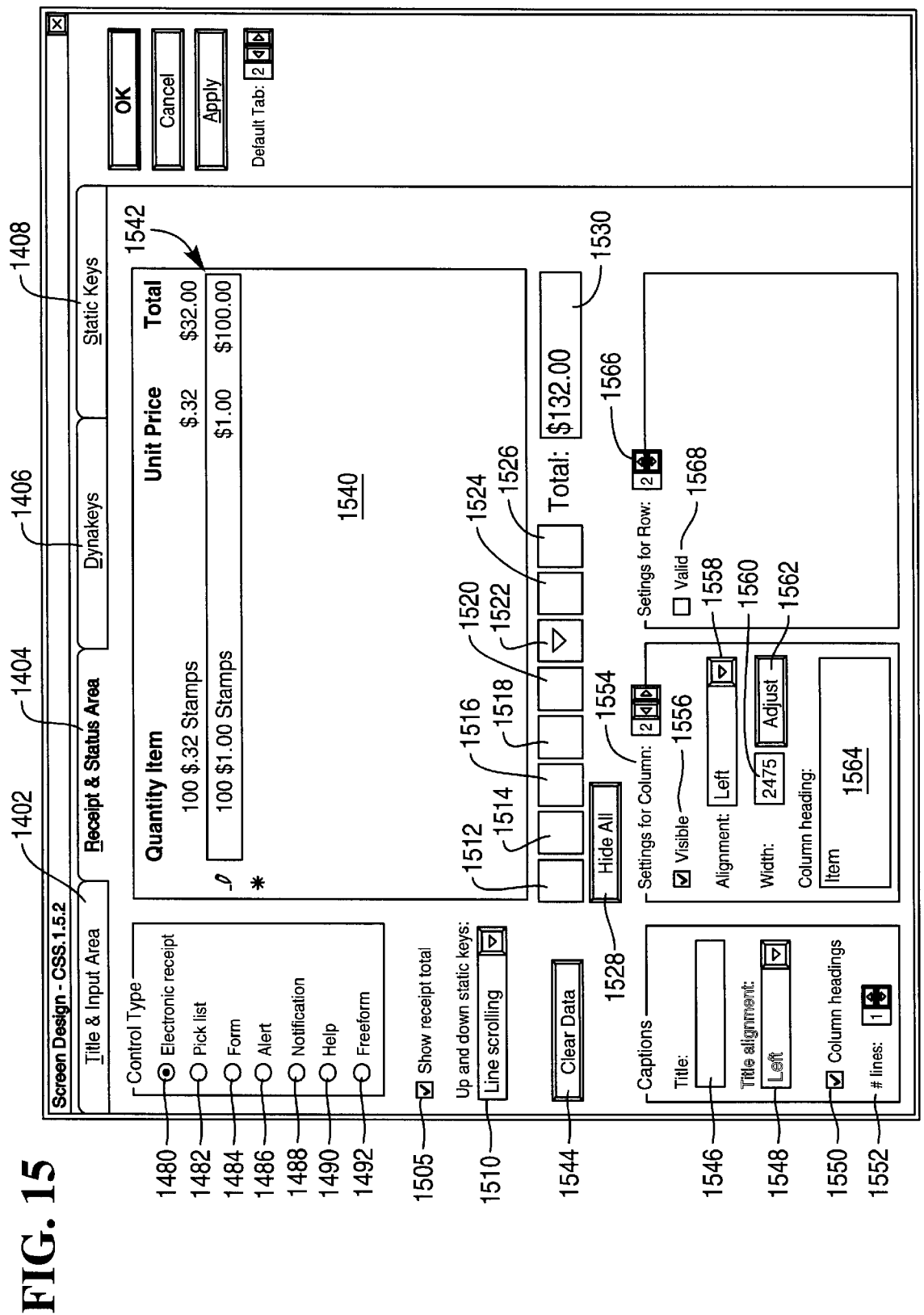
FIG. 15 is a view of a screen depicting a title and input area tab.

Selecting the Receipt and Status Area Tab 1404 displays a plurality of Control Type Radio Buttons including an Electronic Receipt Button 1480, a Pick List Button 1482, a Form Button 1484, an Alert Button 1486, a Notification Button 1488, a Help Button 1490, and a Freeform Button 1492 and allows selection of a control type for the display area. A Show Receipt Total Check Box 1505 allows designation of whether a Receipt Total Box is shown. If shown, it is displayed under the lower-right corner of the display area in this Dialog Box and on the User Screen 700. An Up and Down Static Keys Dropdown List 1510 allows selection of Line Scrolling or Page Scrolling. Selecting an up or down static scroll key on the user screen will scroll the display area 1540 one line at a time if Line Scrolling is selected and one page (screenfull) at a time if Page Scrolling is selected. The list 1510 is applicable to the electronic receipt, pick list, and form control types only. Status Icon Buttons 1912, 1914, 1916, 1918, 1920, 1922, 1924, 1926 allows the user to select which status icons will be displayed on the user screen 700. Selecting a button toggles the display of the icon on or off. Selecting Buttons 1524, 1526 step through the Line Scrolling, Page Scrolling, and No Icon states. The bitmap(s) associated with each button are defined in the Global Design Dialog Box 2900. Selecting a Hide All Button 1528 hides all the status icons 1512–1526. A Receipt Total Label and Text Box 1530 allows entry of a receipt total amount. Whether these controls are displayed is determined by the Show Receipt Total Check Box setting 1505 (FIG. 15). A Display Area 1540 shows and allows editing of the selected display area control type. The authoring controls associated with each display area control type are as follows:

There is a plurality of Electronic Receipt Controls including: Grid 1542, Clear Data Button 1544, Title Text Box 1546, Title Alignment Dropdown List 1548, Column Headings Check Box 1550, # Lines Spin Box 1552, Settings for Column Spin Box 1554, Visible Check Box 1556, Alignment Dropdown List 1558, Width Text Box 1560, Adjust Button 1562, Column Heading Text Box 1564, Settings for Row Spin Box 1566, Valid Check Box 1568. The functions are each the same as for an electronic receipt screen depicted in FIG. 15.

The Grid 1542 allows entry and editing of the electronic-receipt data. Five grid columns and an unlimited number of grid rows are available. The widths of columns and the heights of rows can be set via dragging. The width of each column can also be set via the Width Test Box. A row can be deleted by clicking in the left margin of the row and pressing the Del key. The Clear Data Button 1544 clears all grid data and deletes all but the first grid row. The Title Text Box 1546 allows entry of a title to be displayed at the top of the grid. The Title Alignment Dropdown List 1548 allows selection of an alignment setting (left, centered, or right) for the grid title. Enabled only if a title has been entered. The Column Headings Check Box 1550 allows designation of whether the grid columns have headings. If so, they are editable in this dialog box and are displayed on the user screen. If not, Col1, Col2, etc. is displayed as the column headings in this dialog box, and no column headings are displayed on the user screen. The Lines Spin box 1552 allows selection of the number of lines in each column heading. The Settings for Column Spin Box 1554 allows selection of a grid column to edit properties for. The Visible Check Box 1556 allows designation of whether the selected column is visible in the grid. The Alignment Dropdown List 1558 allows selection of an alignment setting (left, centered, or right) for the selected column. The Width Text Box 1560 allows entry of an exact numeric width for the selected column. Selecting the Adjust Button 1562 adjusts the width of the next-to-last visible column so that the last visible column is right-aligned with the right edge of the grid. The Column Heading Text Box 1564 allows entry of heading for the selected column. The Settings for Row Spin Box 1566 allows selection of a grid row to edit properties for. The Valid Check Box 1568 allows designation of whether the selected row is valid (enabled) in the grid on the user screen. An invalid row cannot be selected (highlighted) by the end user.

Figure 16:
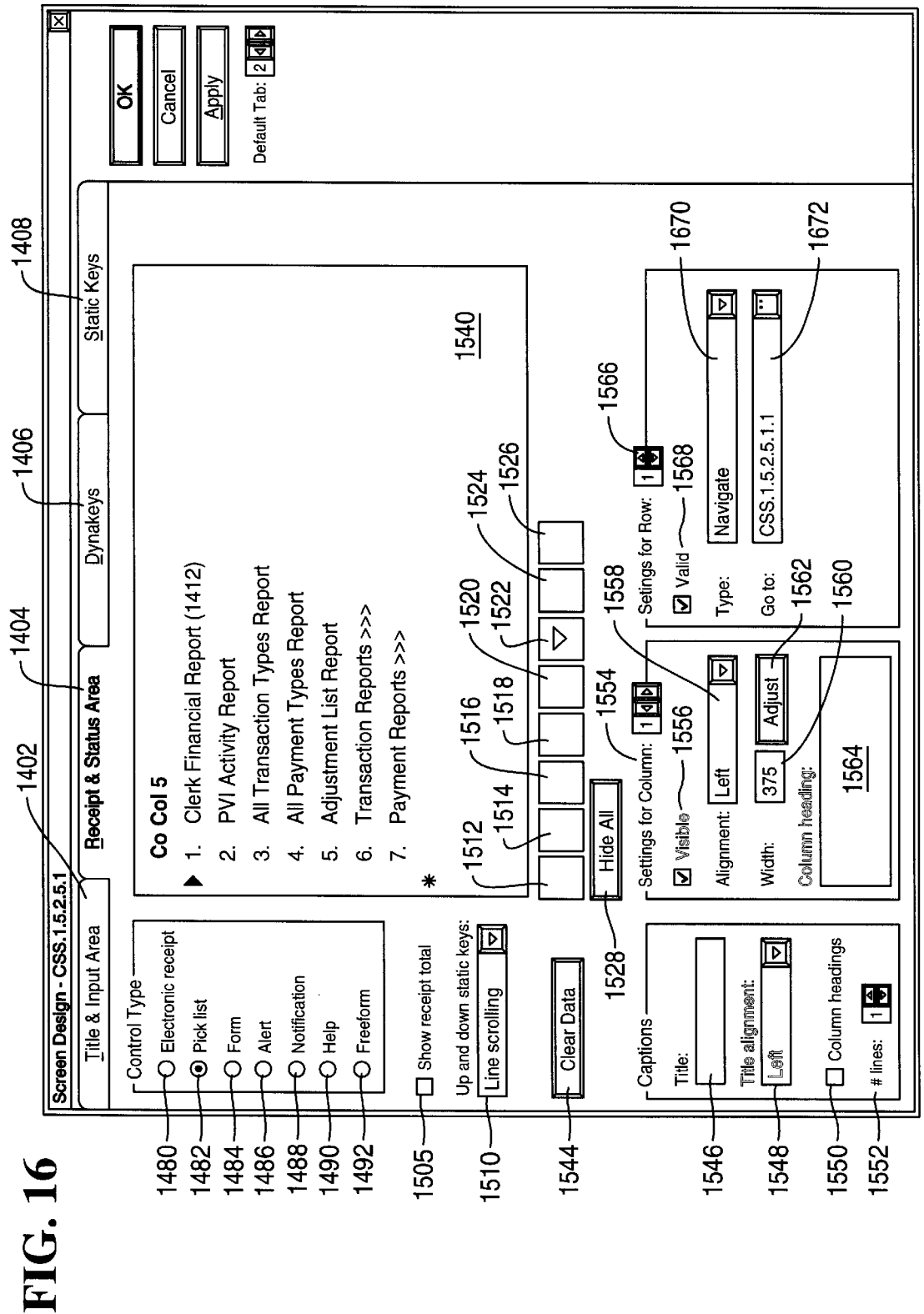
FIG. 16 is a view of a screen receipt and status area tab.

As depicted in FIG. 16, the pick list radio button 1482 has been selected. A Type Dropdown List 1670 allows selection of one of the following types for the selected row:

Navigate: When the Enter static or keyboard key is pressed when the selected row is highlighted on the user screen, the target application will navigate to the screen ID selected via the Go To control.

Return: When the Enter static or keyboard key is pressed when the selected row is highlighted on the user screen, the target application will navigate to the previous screen viewed.

Command: No visible action will occur when the Enter static or keyboard key is pressed when the selected row is highlighted on the user screen.

ToSaved: When the Enter static or keyboard key is pressed when the selected row is highlighted on the user screen, the target application will navigate to a saved screen ID. See the Save Screen ID check box for static keys below.

Check: When the Enter static or keyboard key is pressed when the selected row is highlighted on the user screen, the selection state of the Dynakey selected in the DK # spin box will be toggled.

A Go To Box 1672 displays the ID of the screen that a Navigate pick-list item will navigate to when it is highlighted on the user screen and the Enter static or keyboard key is pressed (read-only). Selecting this text box or the button in it opens the Screen Selection dialog box 1000. A DK # Spin Box (not shown) allows selection of a Check-type Dynakey number whose check box will be toggled when a Check-type pick-list item is highlighted and the Enter static or keyboard key is pressed.

Figure 17:
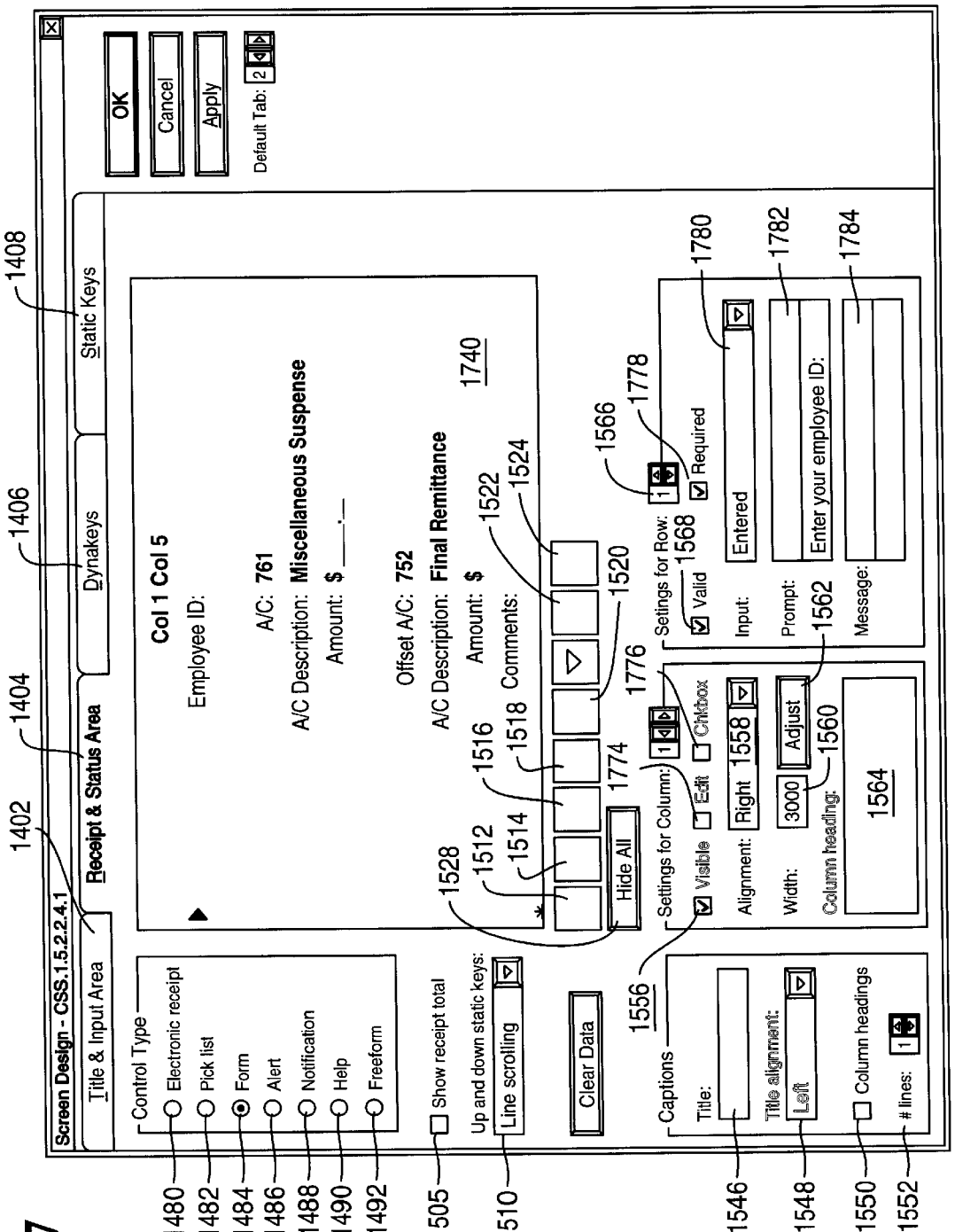
FIG. 17 is a view of a screen for the receipt and status area tab with the form selected.

There is a plurality of Form Controls depicted in FIG. 17: Grid 1542, Clear Data Button 1544, Title Text Box 1546, Title Alignment Dropdown List 1548, Column Headings Check Box 1550, # Lines Spin Box 1552, Settings for Column Spin Box 1554, Visible Check Box 1556, Alignment Dropdown List 1558, Width Text Box 1560, Adjust Button 1562, Column Heading Text Box 1564, Settings for Row Spin Box 1566, Valid Check Box 1568. The functions are each the same as for an electronic receipt screen depicted in FIG. 15.

An Edit Check Box 1774 (a column setting) allows designation of whether values in the selected column are editable in the form on the user screen. At most one column can be editable. If a column is editable, its value is echoed in the user input area on the user screen when it is highlighted, and the contents of the user input area are entered into the grid cell when the Enter static or keyboard key is pressed. A Check Box Check Box 1776 (a column setting) allows designation of whether a check box is displayed in each of the cells in the selected column in the form on the user screen. A Required Check Box 1778 (a row setting) allows designation of whether the selected row is a required field in the form on the user screen. An Input Dropdown List 1780 (a row setting) allows selection of either Entered or Dynakey. If Entered is selected, form input will be entered via the keyboard or static numeric keypad. If Dynakey is selected, selecting a Toggle Checkbox-type Dynakey will toggle the check box value in the highlighted form row. Prompt Text Boxes 1782 (a row setting) allows entry of the one or two line prompt that will be displayed on the user screen when the selected row is highlighted. Message Text Boxes 1784 (a row setting) allows entry of the one or two line message that will be displayed on the user screen when the selected row is highlighted.

The Alert, Notification, and Help Controls each have a multi-line Text Box 1840 as depicted in FIG. 8, which allows entry of the alert, notification, or help text, respectively.

Figure 18:
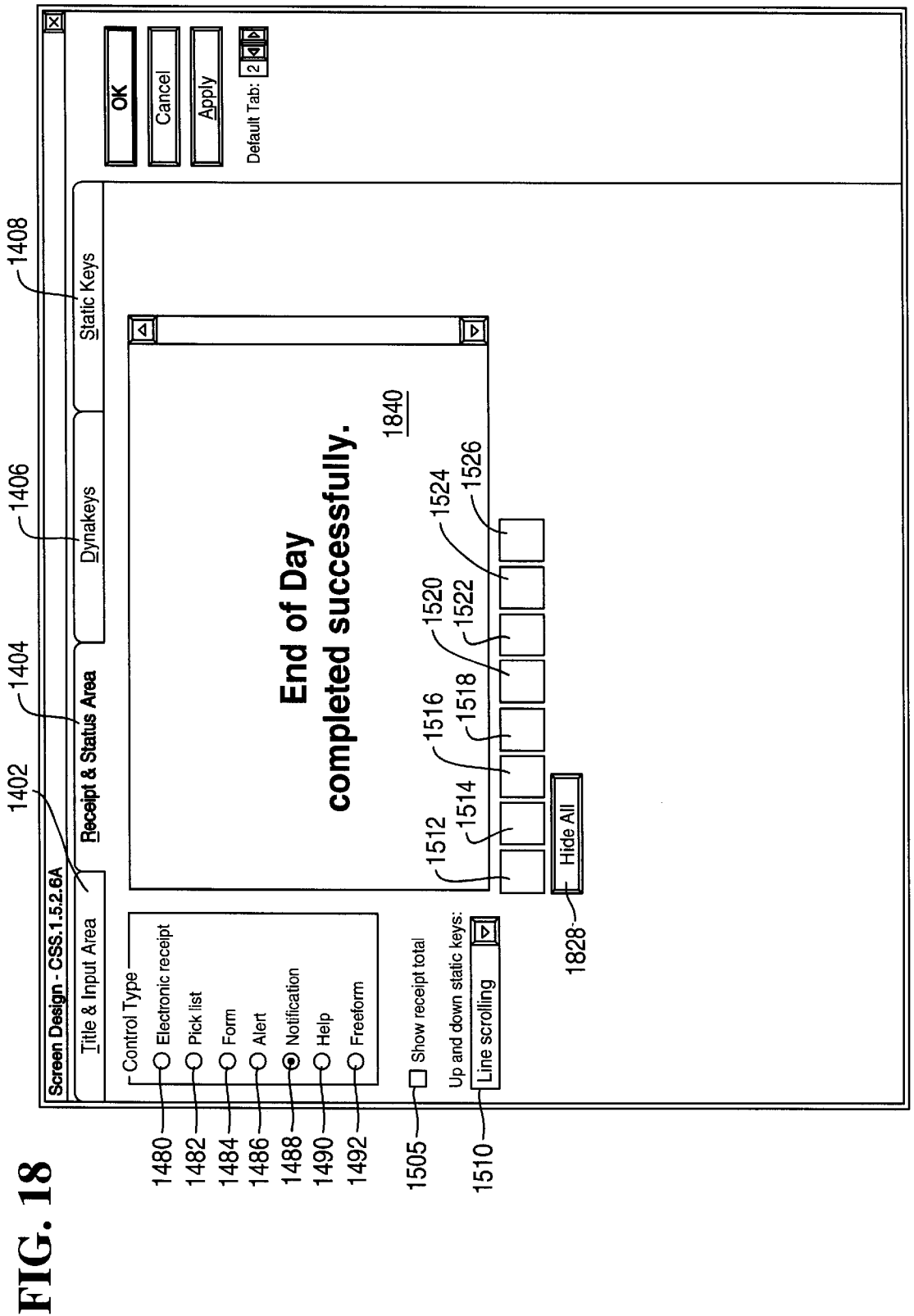
FIG. 18 is a view of a screen for the receipt and status area tab with the notification selected.
Figure 19:
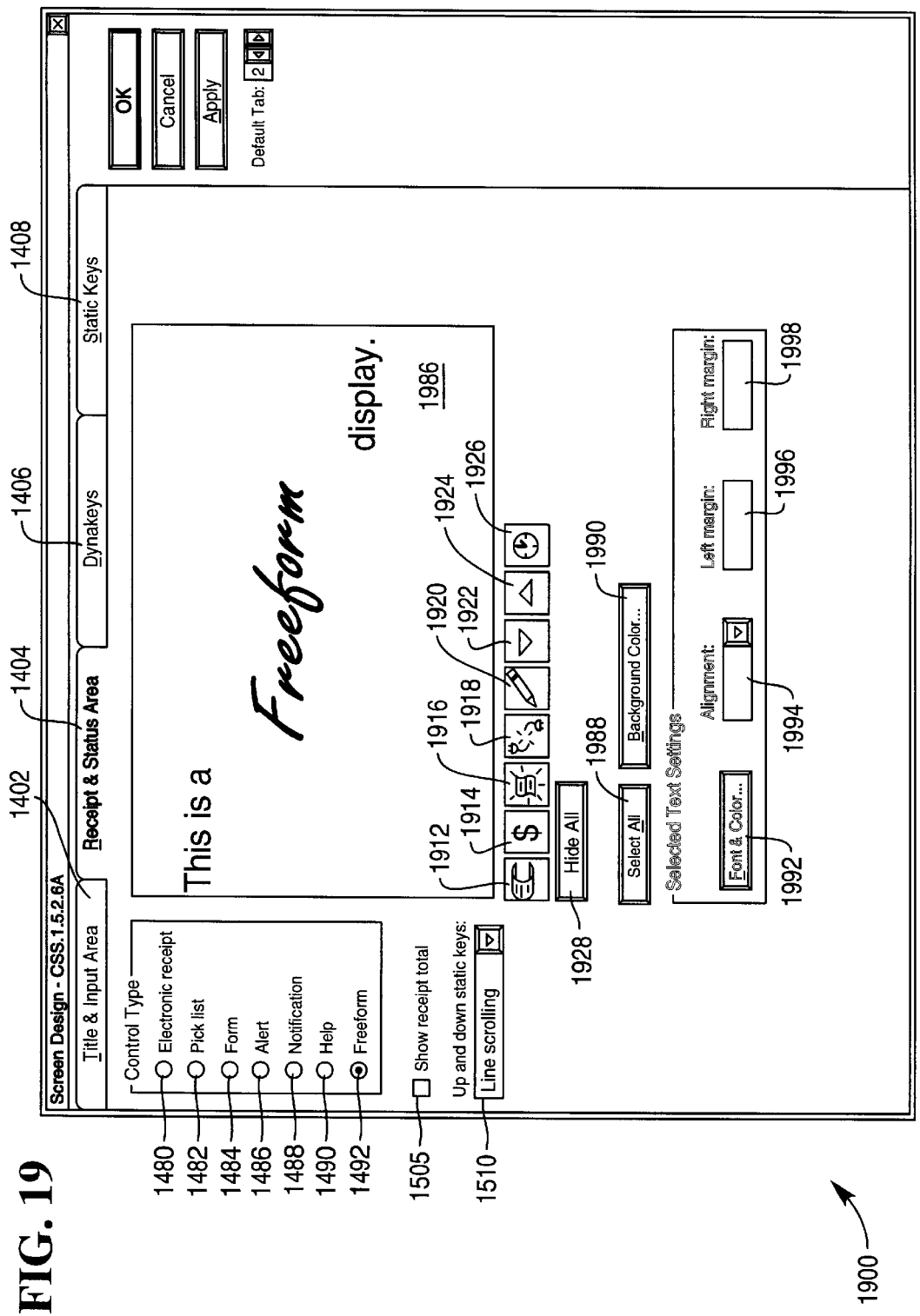
FIG. 19 is a view of a screen for the receipt and status area tab with the freeform selected.

The notification screen is depicted in FIG. 18 in which the notification radio button 1488 has been selected. A Freeform Screen 1900 as depicted in FIG. 19 includes Freeform Controls including a Rich Text Box 1986, a Select All Button 1988, and a Background Color Button 1990. The Rich Text Box 1986 allows entry of the freeform text. The Select All Button 1988 selects all the text in the rich text box. Selecting a Background Color Button 1990 opens a standard Windows color dialog box, which allows selection of a background color for the rich text box. Selecting a Font & Color Button 1992 opens a standard Windows font dialog box, which allows selection of font and color properties for the selected text in the rich text box. An Alignment Dropdown List 1994 allows selection of an alignment (left, centered, or right) for the selected text in the rich text box. A Left Margin Text Box 1996 allows entry of a numeric left margin width for the selected text in the rich text box. A Right Margin Text Box 1998 allows entry of a numeric right margin width for the selected text in the rich text box.

Figure 20:
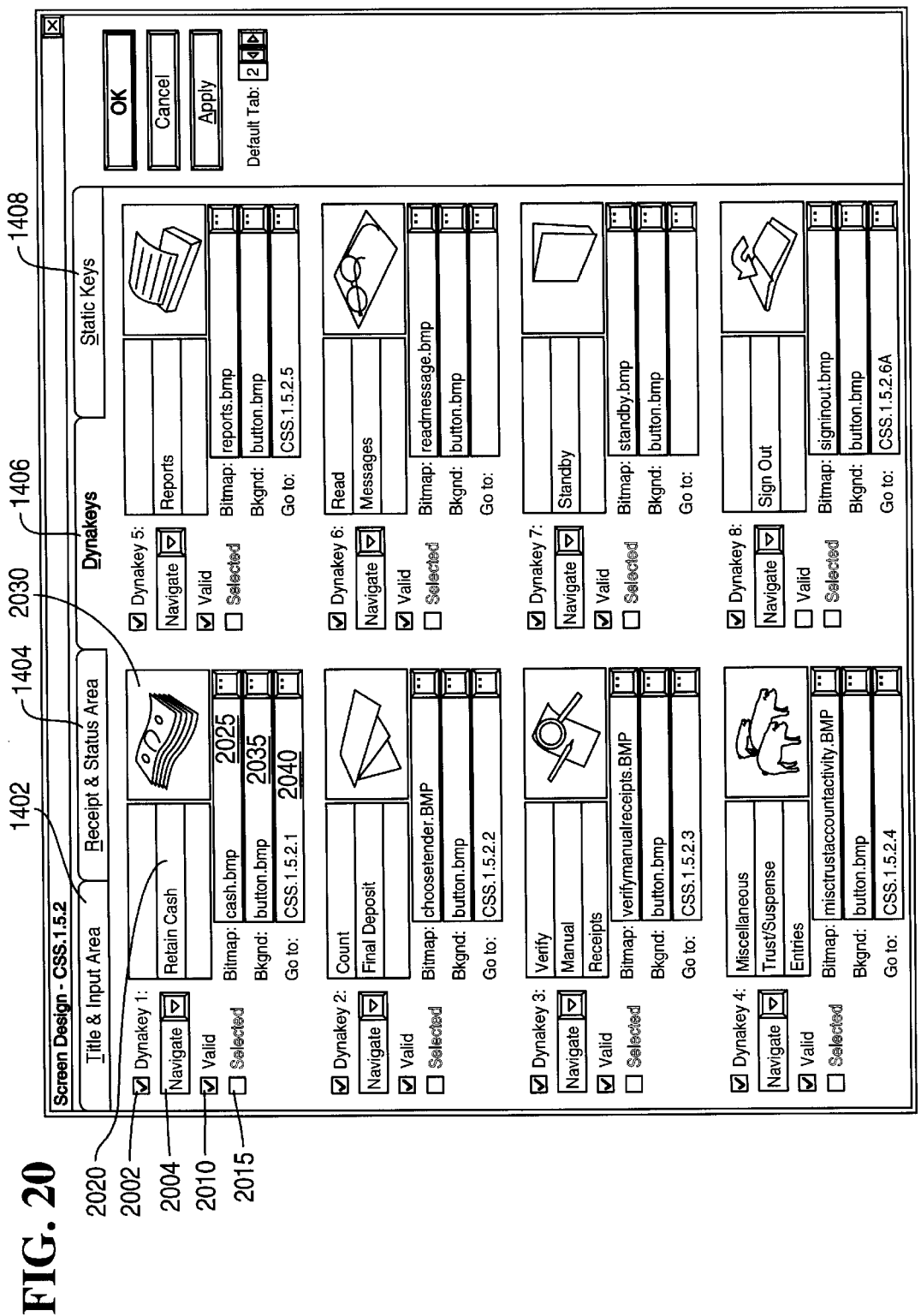
FIG. 20 is a view of a screen for the dynakeys settings.

Selecting the Dynakeys tab 1406 displays the screen depicted in FIG. 20. Each of the eight keys (Dynakeys 1–8 correspond to Ref. Nos. 782–796 in FIG. 7) has the same features and only the features of key 1 are discussed herein as this key is representative of keys 2–8. A Dynakey Check Box 2002 allows designation of whether the Dynakey (background bitmap, label, and foreground bitmap) will be displayed on the user screen. If selected, enables the other Dynakey controls. If unselected, clears and disables the other Dynakey controls. A Type Dropdown List 2004 allows selection of one of the following types for the Dynakey:

Navigate: When the Dynakey is selected on the user screen, the target application will navigate to the screen ID selected via Go To control.

Return: When the Dynakey on the user screen, the target application will navigate to the previous screen viewed.

Command: No visible action will occur when the Dynakey is selected on the user screen 700.

Check: A Windows check box will be displayed on the Dynakey on the user screen. Selecting the Dynakey will toggle the selection state of the check box.

Radio: A Windows radio will be displayed on the Dynakey on the user screen. Selecting the Dynakey will select the radio button a de-select other radio buttons.

ToSaved: When the Dynakey on the user screen is selected, the target application will navigate to a saved screen ID; see the Save Screen ID check box for static keys below.

Toggle Checkbox: When the Dynakey on the user screen is selected, the selection state of the check box in the highlighted row of the form in the display area will be toggled.

Figure 22:
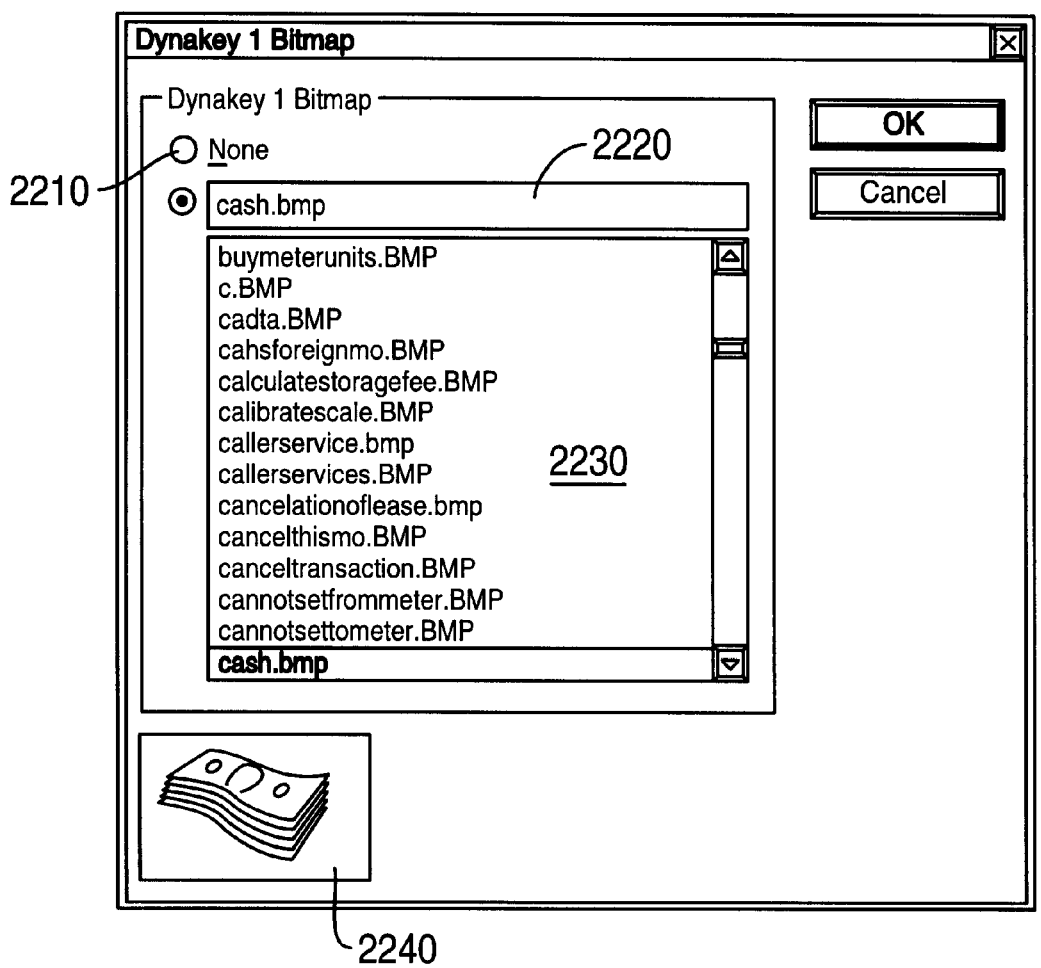
FIG. 22 is a view of a screen of a bit map selection dialog box.

A Valid Check Box 2010 allows designation of whether the Dynakey is valid (enabled). If invalid, the Dynakey label text is grayed and selection of the Dynakey does nothing. A Selected Check Box 2015 is enabled only for Check and Radio Dynakey types, allows designation of the default state of the check box on a Check Dynakey or the radio button on a Radio Dynakey. A Label Text Box 2020 allows entry of a one, two, or three line label for the Dynakey. A Bitmap Text Box 2025 displays the name of the file that contains the foreground bitmap for the Dynakey (read-only). Selecting this text box or the button in it opens the Bitmap Selection Dialog Box 2200 (FIG. 22). A Graphic Area 2030 displays the foreground bitmap for the Dynakey. A Background Text Box 2035 displays the name of the file that contains the background bitmap for the Dynakey (read-only). Selecting this text box or the button in it opens the Bitmap Selection Dialog Box 2200(FIG. 22). This bitmap file defaults to that set in the Global Design Dialog Box 2900. A Go To Text Box 2040 displays the ID of the screen that selection of the Dynakey will navigate to (read-only). Selecting this text box or the button in it opens the Screen Selection Dialog Box (FIG. 1000).

Figure 21:
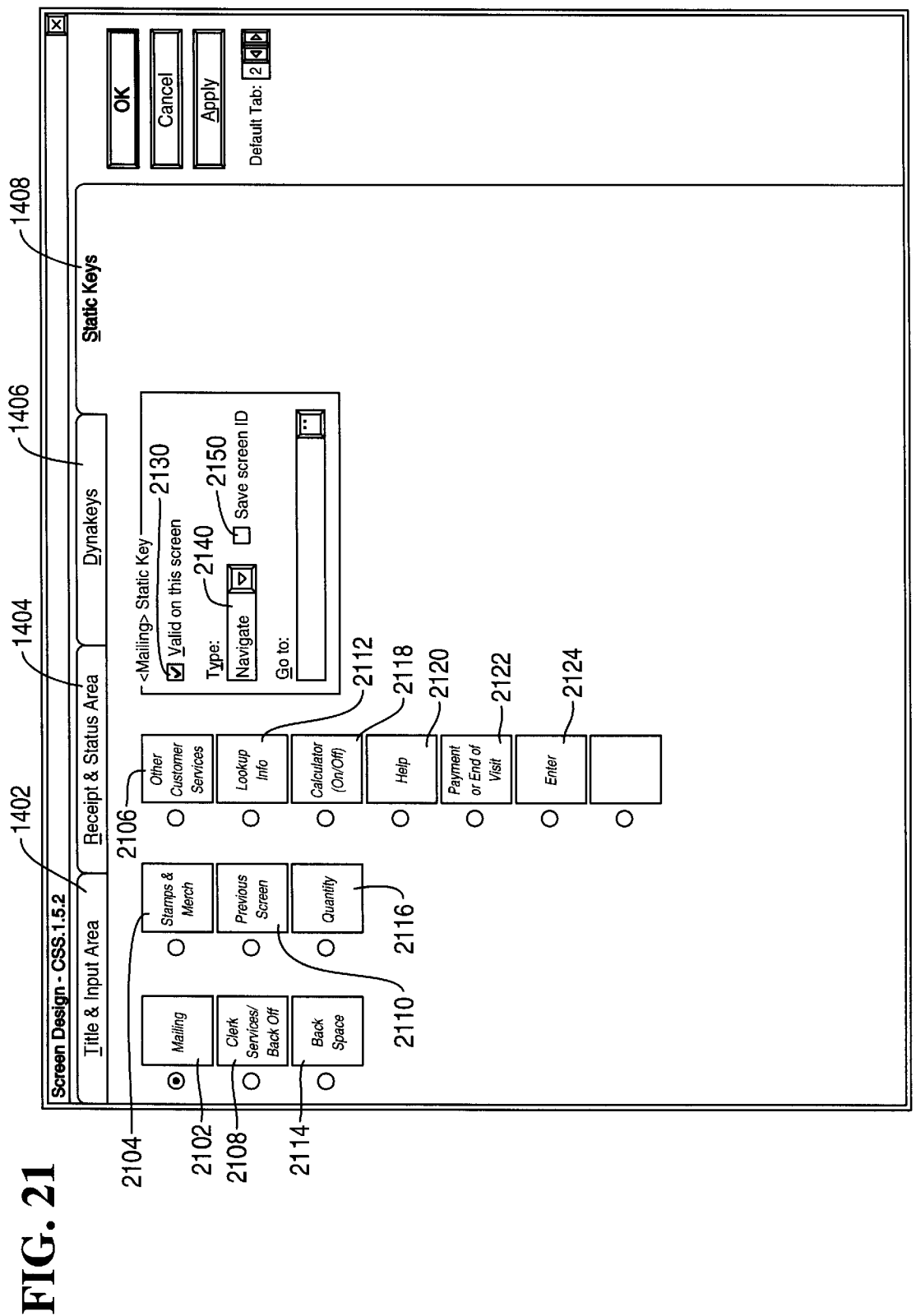
FIG. 21 is a view of a screen a static keys tab.

Selecting the static keys tab 1408 displays the screen depicted in FIG. 21. A plurality of Static Key Buttons 2102–2124 allow selection of a corresponding static key (Ref Nos. 700–725) for editing. A Valid on this Screen Check Box 2130 allows designation of whether the selected static key is valid (enabled). Selection of an invalid static key does nothing. A Type Dropdown List 2140 allows selection of one of the following types for the static key:

Navigate: When the static key is selected on the user screen, the target application will navigate to the screen ID selected via the Go To control.

Return: When the static key is selected on the user screen, the target application will navigate to the previous screen viewed.

Command: For static keys other than keys 2114 and 2124, no visible action will occur when the static key is selected on the user screen. Key 2114 is hard-coded to perform a backspace function. Key 2124 is hard-coded to perform Enter functions.

A Save Screen ID Check Box 2150 allows designation of whether the current screen ID should be saved when the static key is selected on the user screen. Pick-list items and Dynakeys that have a ToSaved type will navigate to saved screen ID.

A Bitmap Selection Dialog Box 2200 is depicted in FIG. 22. The Bitmap Selection Dialog Box 2200 allows selection of a bitmap for use as a screen background, screen corner, Dynakey background or foreground, display-area background, or status icon. The Bitmap Selection Dialog Box 2200 opens when a bitmap text box is selected in the Screen Design Dialog Box 1000 or the Global Design Dialog Box 2900. Selecting a None Radio Button 2210 results in the clearing of the bitmap in the area of the target application user interface from which this dialog box was opened when the OK button is selected or the radio button is double-clicked. Selection clears the bitmap text box and list highlighting. A Text Box 2220 displays the bitmap file name selected in the bitmap list. A Bitmap List 2230 lists the bitmap files in the Screen Backgrounds, Screen Corners, Dynakey Background, Dynakey Foregrounds folder, Display-Area Backgrounds folder, or Status Icons folder, depending on where this dialog box was opened from. A Graphic Area 2240 displays the selected bitmap.

Figure 23:
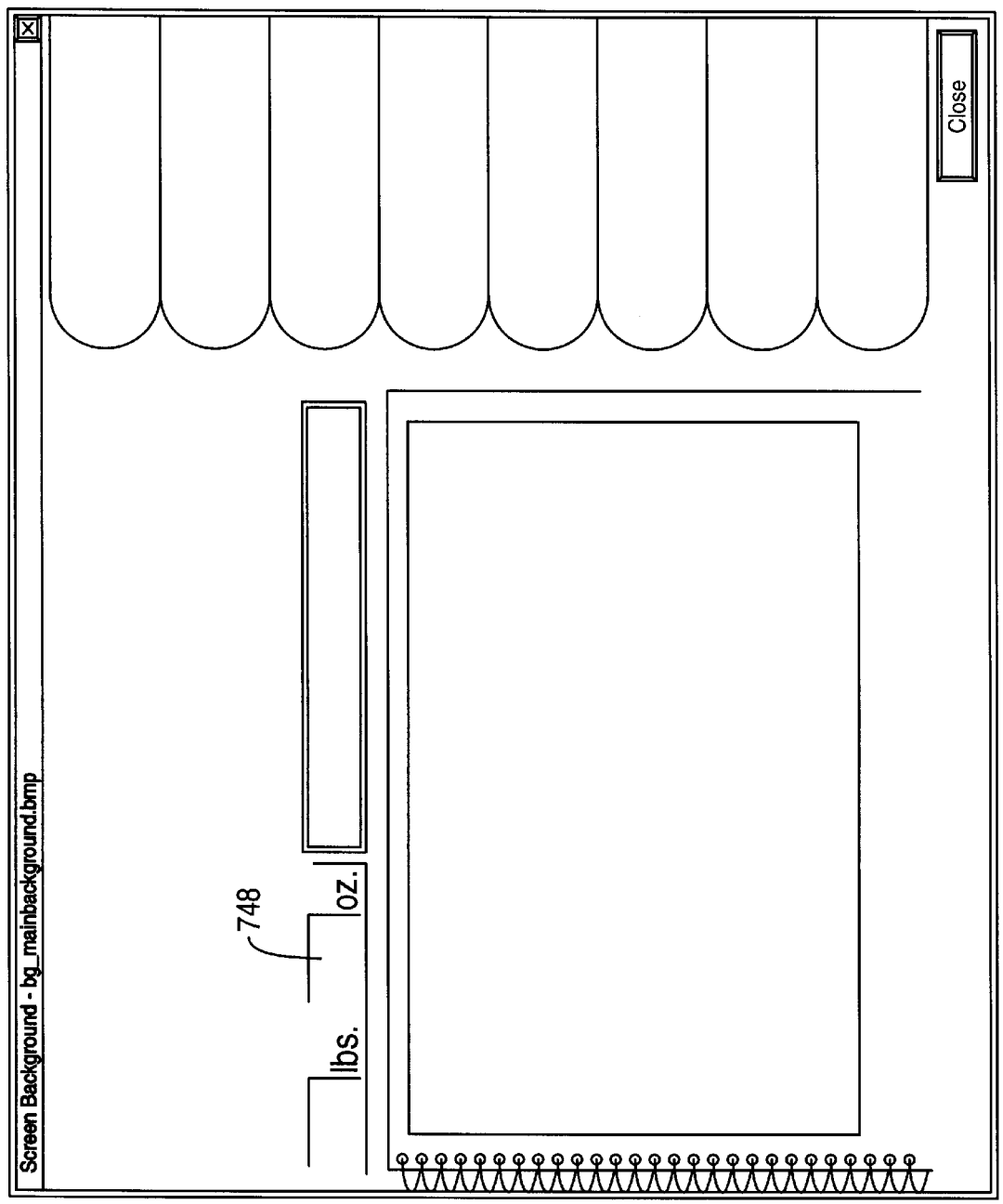
FIG. 23 is a view of a screen of a background dialog box.

A Screen Background Dialog Box 2300 is depicted in FIG. 23. The Screen Background Dialog Box 2300 shows the bitmap selected for the screen background. The Screen Background Dialog Box 2300 opens when the Show button is selected in the Title & Input Area Tab 1402 of the Screen Design Dialog Box 1400 or in the Bitmap Selection Dialog Box 2200 when selecting a screen background.

A Screen Comments Dialog Box 2400 is depicted in FIGS. 24–28.

The Screen Comments Dialog Box 2400 displays the properties of each area of the current screen and allows entry of comments. The Screen Comments Dialog Box 2400 opens when the Screen Comments Item in the comments menu on the user screen 700 is selected and when the Screen Comments 754 button in the Global Comments Dialog Box 2900 is selected. The Screen Comments Dialog Box 2400 includes a General Tab 2410, a Left Areas Tab 2420, a Dynakeys Tab 2430, a Static Keys Tab 2440 and a Change History Tab 2450. Selecting the General Tab 2410 displays the screen depicted in FIG. 24. Selecting the Left Areas Tab 2420 displays the screen depicted in FIG. 25. Selecting the Dynakeys Tab 2430 displays the screen depicted in FIG. 26. Selecting the Static Keys Tab 2440 displays the screen depicted in FIG. 27. Selecting the Change History Tab 2450 displays the screen depicted in FIG. 28.

Figure 24:
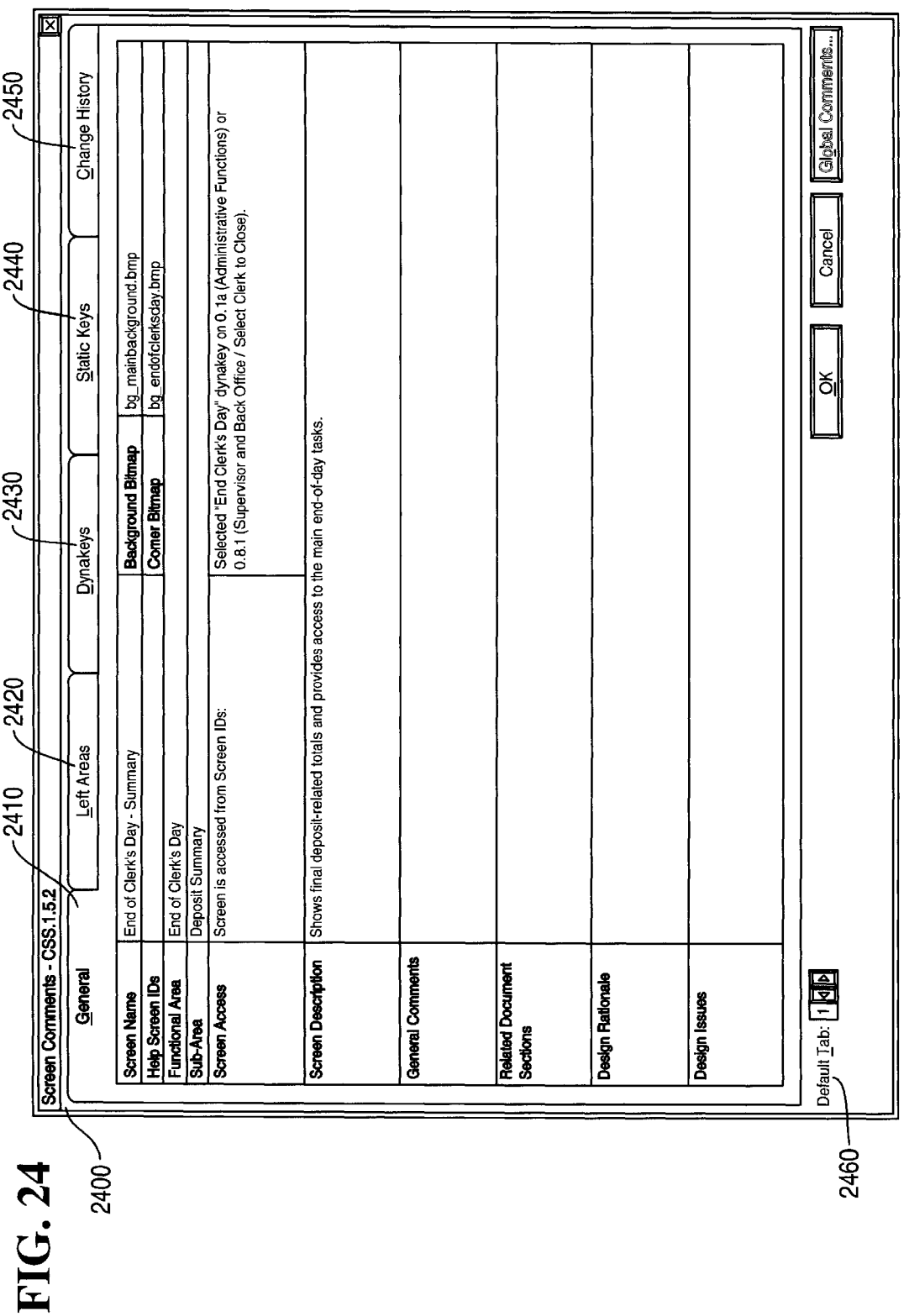
FIG. 24 is a view of a screen of a general tab screen comments.
Figure 25:
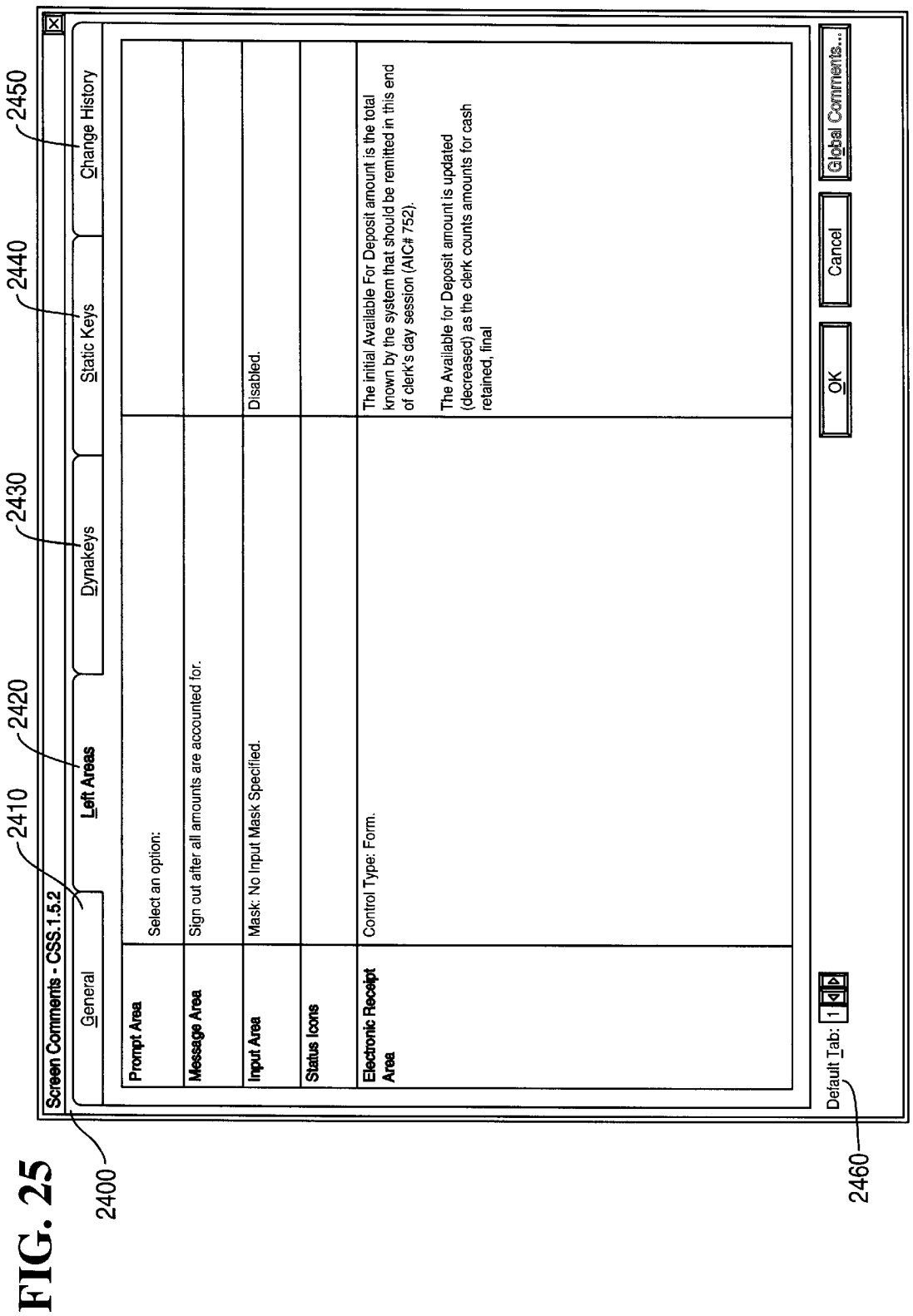
FIG. 25 is a view of a screen of a left areas tab for screen comments.
Figure 26:
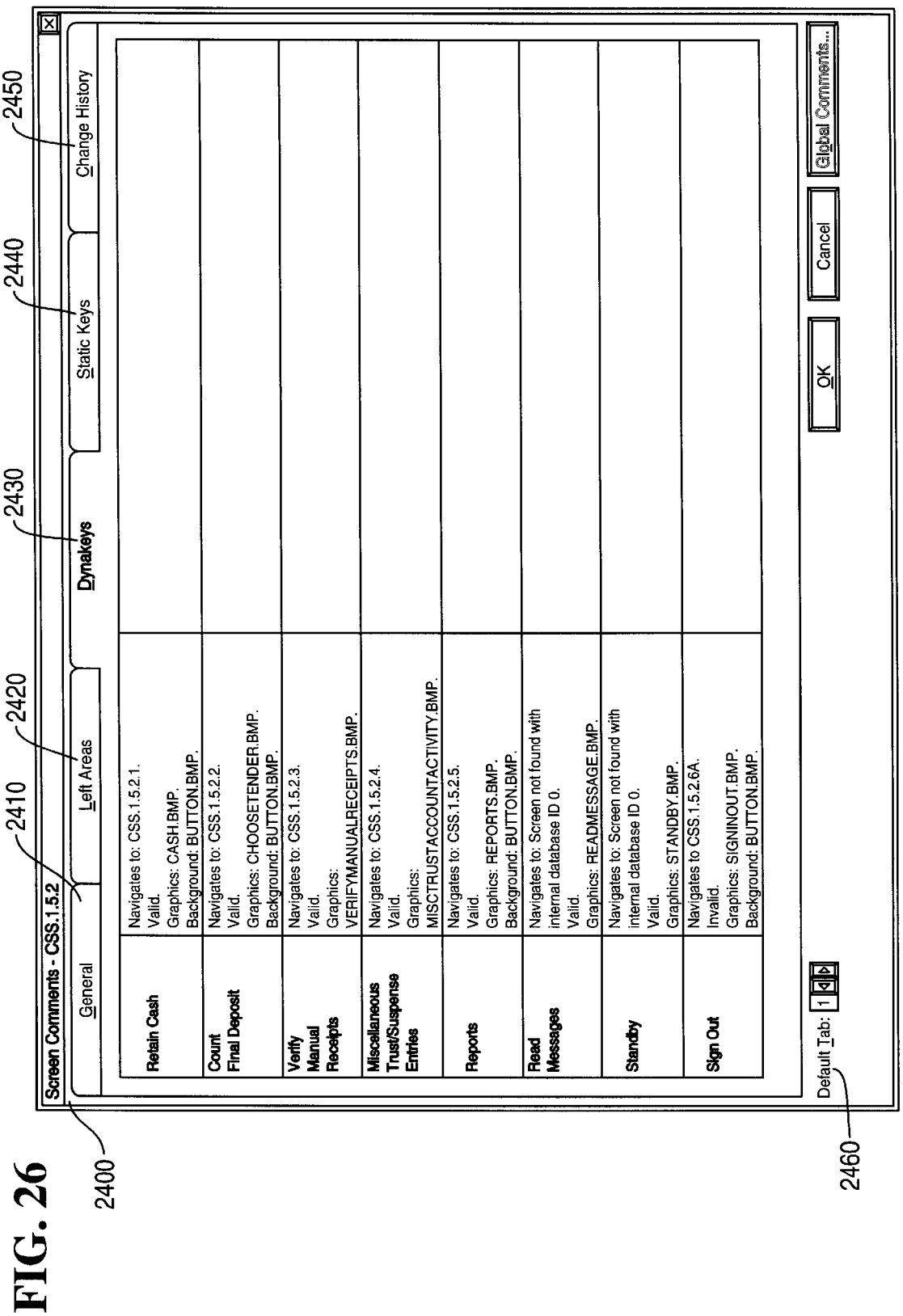
FIG. 26 is a view of a screen of a Dynakeys tab for screen comments.
Figure 27:
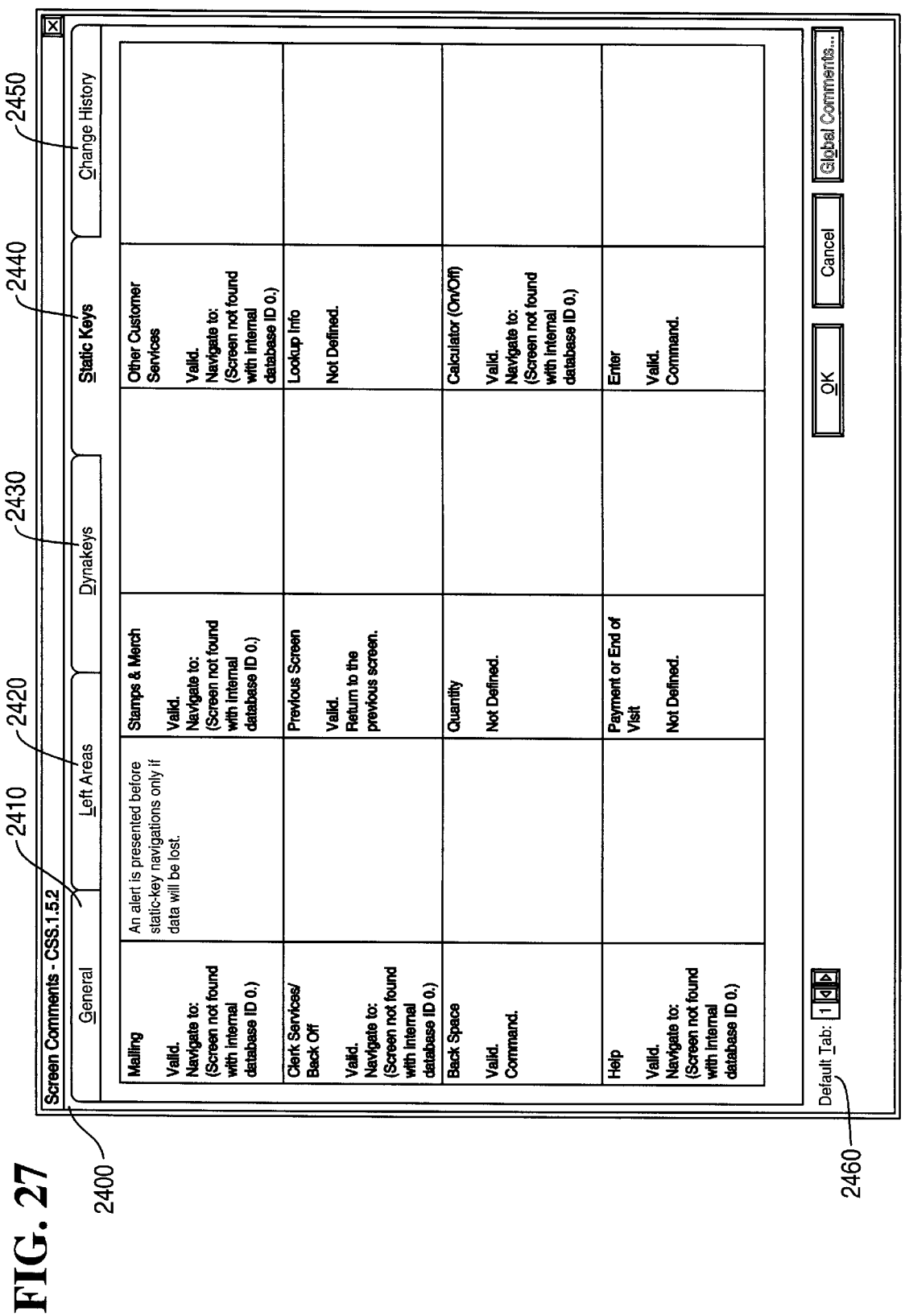
FIG. 27 is a view of a screen of a static keys tab for screen comments.
Figure 28:
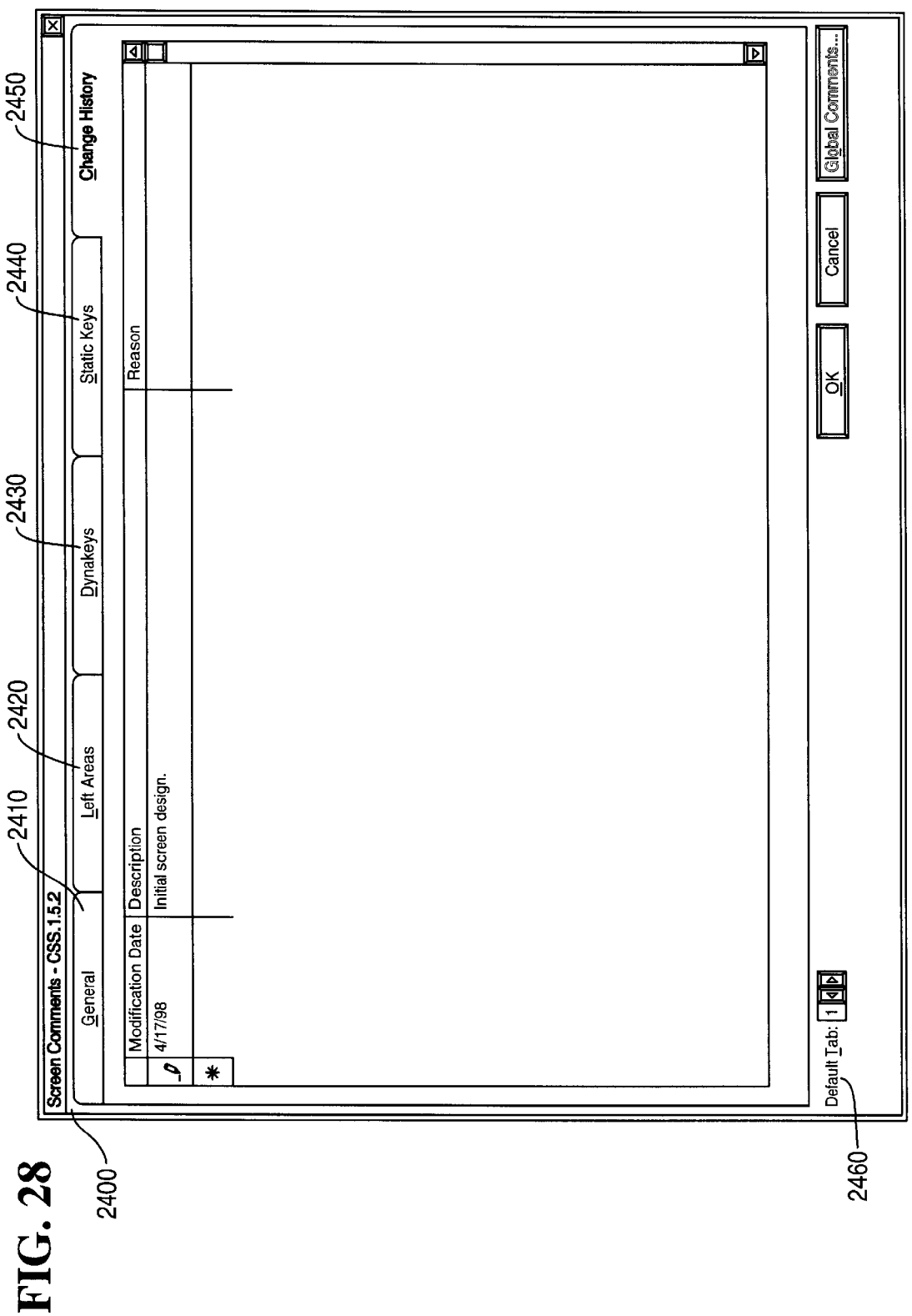
FIG. 28 is a view of a screen of a change history for screen comments.

In FIGS. 24–28, cells with a dark gray background display the area of the target user interface to which the comments pertain. Cells with a medium-gray background display the automatically documented properties of the areas. Cells with a white background allow entry of comments. A Default Tab Spin Box 2460 allows the user to select any of the five tabs in the dialog box as the default tab. The default tab is the initial tab to display when the dialog first opens. FIG. 24 displays comments for a general tab 2410. FIG. 25 displays comments for a left areas tab 2420. FIG. 26 displays comments for a dynakeys tab 2430. FIG. 27 displays comments for a static keys tab 2440. FIG. 28 displays comments for a change history tab 2450.

Figure 29:
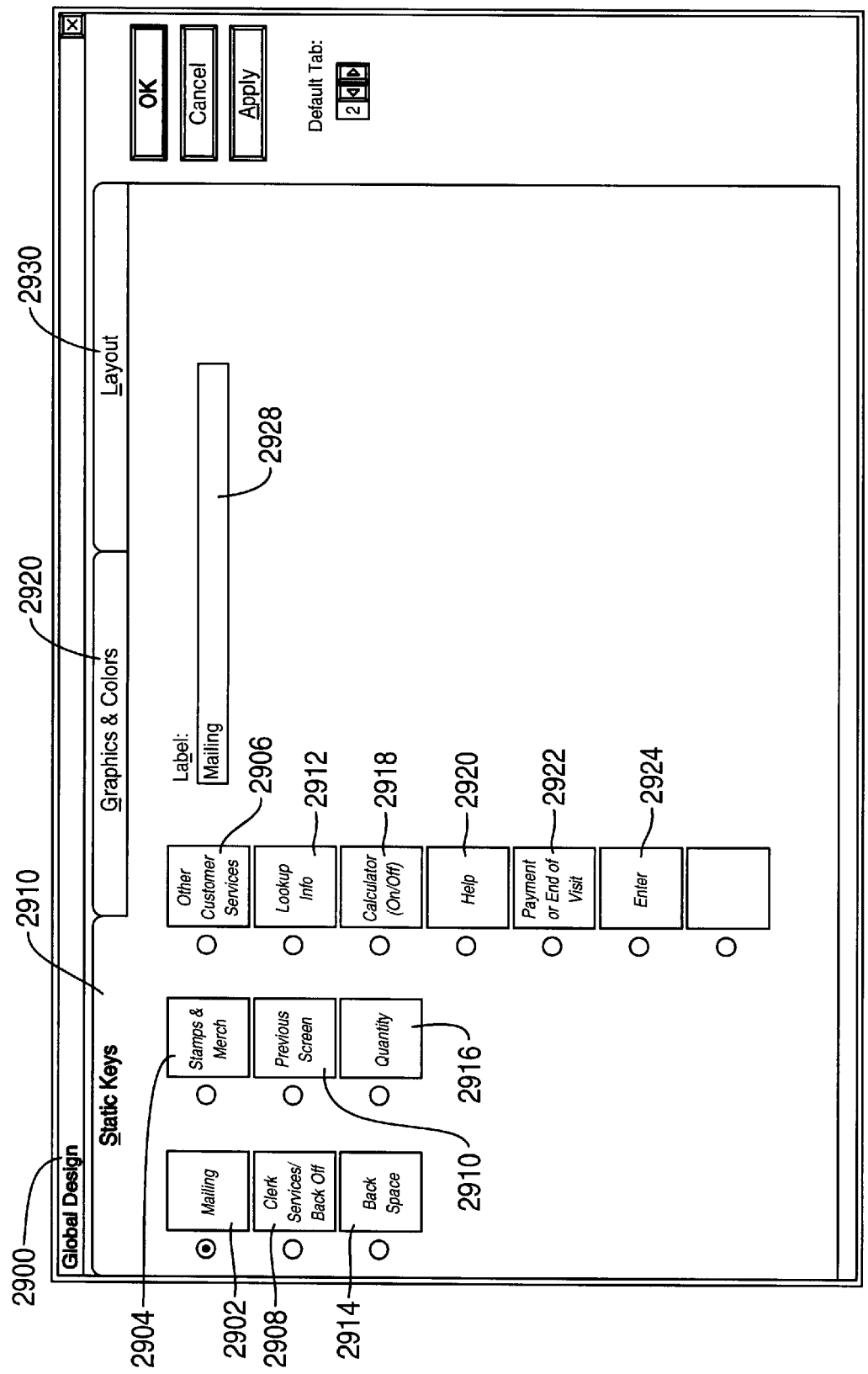
FIG. 29 is a view of a screen for global design for the static keys tab.

A Global Design Dialog Box is 2900 depicted in FIG. 29. The Global Design Dialog Box 2900 allows the user to label the static keys, select status icon bitmaps, and set visual properties for different areas of the user screen. The Global Design Dialog Box 2900 opens when the Global Design Button 760 on the user screen 700 is selected. Three tabs allow for selection and design of static keys 2910, graphics and colors 2920, and layout 2930.

FIG. 29 shows the controls for designating the labels of the static keys 704–726 depicted in FIG. 7. Selecting a radio or command button 2902–2926 displays and allows editing of the button's label in text box 2928.

Figure 30:
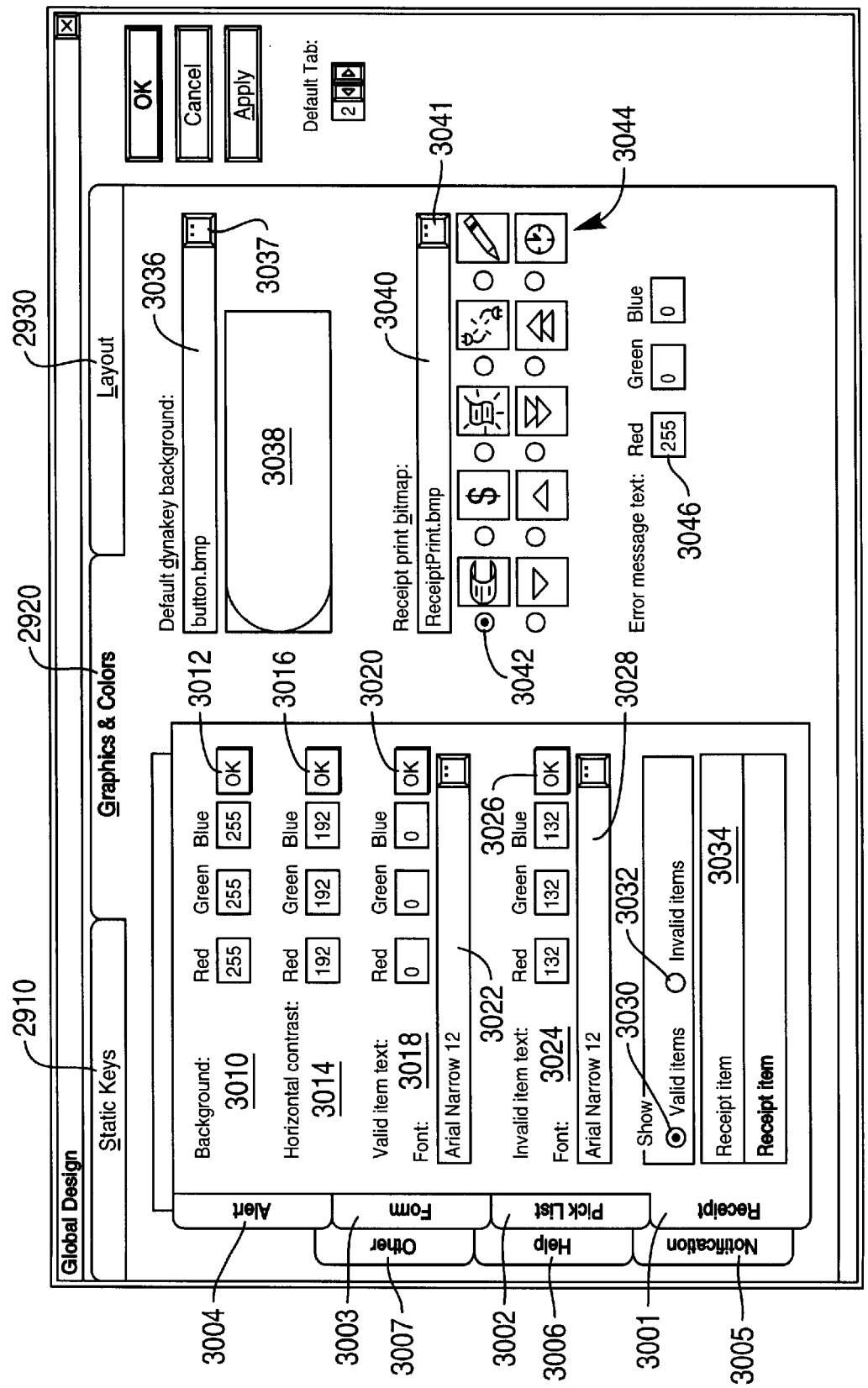
FIG. 30 is a view of a screen of a graphics and colors tab for the receipt sub-tab.

A global design dialog box 3000 is depicted in FIG. 30 with the graphics and colors tab 2920 having been selected. There are sub-tabs for receipt 3001, pick list 3002, form 3003, alert 3004, notification 3005, help 3006, and other 3007. There are identical controls on the Receipt 3001 and Pick List 3002 sub-tabs. The controls on the Receipt sub-tab

3001 affect the appearance of electronic receipts, and the controls on the Pick List sub-tab 3002 affect the appearance of pick lists. The Background Color Edit Boxes 3010 allow entry of the red, green and blue (RGB) values for the background of the odd-numbered rows of the display-area. Selecting a Background Color OK Button 3012 refreshes the display sample at the bottom of the sub-tab with the background RGB values. The Horizontal Contrast Color Edit Boxes 3014 allow entry of the red, green and blue (RGB) values for the background of the even-numbered rows of the display area. Selecting a Horizontal Contrast Color OK Button 3016 refreshes the display sample at the bottom of the sub-tab with the horizontal contrast RGB values. The Valid Item Text Color Edit Boxes 3018 allow entry of the red, green and blue (RGB) values for valid items in the display-area. Selecting a Valid Item Text Color OK Button 3020 refreshes the display sample at the bottom of the sub-tab with the valid item text RGB values. The Valid Item Text Font Edit Box 3022 shows the font properties of valid items in the display-area (read-only). Selection of the text box or the button in it opens a standard Windows Font dialog box. The Invalid Text Color Edit Boxes 3024 allow entry of the red, green and blue (RGB) values for invalid items in the display-area. Selecting an Invalid Text Color OK Button 3026 refreshes the display sample at the bottom of the sub-tab with the invalid item text RGB values. An Invalid Item Text Font Edit Box 3028 shows the font properties of invalid items in the display-area (read-only). Selection of the text box or the button in it opens a standard Windows Font dialog Box. Selecting a Valid Items Radio Button 3030 shows the appearance of valid items in the display-area sample at the bottom of the sub-tab. Selecting an Invalid Items Radio Button 3032 shows the appearance of invalid items in the display-area sample at the bottom of the sub-tab. A Sample Area 3034 shows how valid or invalid items will appear in the display area. A Default Dynakey Background Text Box 3036 shows the name of the file containing the default Dynakey background bitmap (read-only). (When a Dynakey is turned on in the Screen Design Dialog Box 1400, this bitmap is selected as the background bitmap by default.) Selection of the text box or the button in it 3037 opens the Bitmap Selection Dialog Box 2200. A Graphic Area 3038 shows the default Dynakey background bitmap. A Status Icon Bitmap Text Box 3040 shows the name of the file containing the status bitmap for the selected status-icon position (read-only). Selection of the text box or the button in it 3041 opens the Bitmap Selection Dialog Box. Status Icon Radio Buttons 3042 show and allow selection of which status icon is selected for editing. Status Icon Buttons 3044 allow selection of a status icon for editing. Error Message Text Color Edit Boxes 3046 allow entry of the red, green and blue (RGB) values for error messages.

Figure 31:
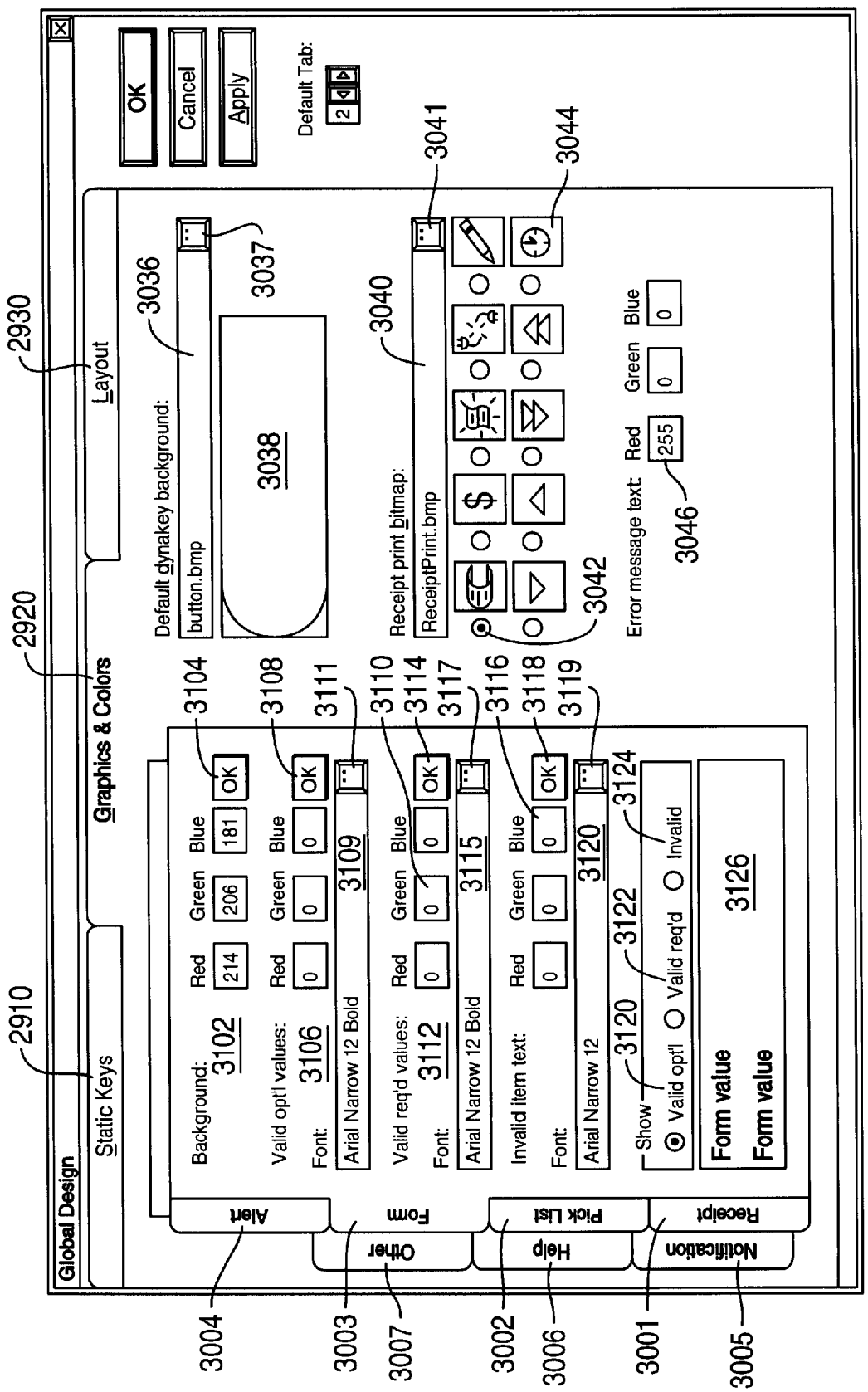
FIG. 31 is a view of a screen of a graphics and colors tab for the form sub-tab.

As depicted in FIG. 31, the form sub-tab 3003 for a graphics and colors tab 2920 is selected from the global design dialog box 3000. The Background Color Edit Boxes 3102 allow entry of the red, green, and blue (RGB) values for the background of forms in the display-area. Selecting the Background Color OK button 3104 refreshes the display sample at the bottom of the sub-tab with the background RGB values. The Valid Optional Color Edit Boxes 3106 allow entry of the red, green and blue (RGB) values for valid, optional, editable fields in forms. Selecting the Valid Optional Color OK Button 3108 refreshes the display sample at the bottom of the sub-tab with the valid optional RGB values. The Valid Optional Text Font Edit Box 3109 shows the font properties of valid, optional, editable fields in forms (read-only). Selection of the text box or the button 3111 in it opens a standard Windows Font dialog box. The Valid Required Color Edit Boxes 3110 allow entry of the red, green and blue (RGB) values for valid, required, editable fields in forms. Selecting the Valid Required Color OK Button 3114 refreshes the display sample at the bottom of the sub-tab with the valid required RGB values. The Valid Required Text Font Edit Box 3115 shows the font properties of valid, required, editable fields in forms (read-only). Selection of a text box or the button 3117 in it opens a standard Windows Font dialog box. The Invalid Item Color Edit Boxes 3116 allow entry of the red, green and blue (RGB) values for invalid (non-editable) fields in forms. Selecting the Invalid Item Color OK Button 3118 refreshes the display sample at the bottom of the sub-tab with the invalid-item RGB values. The Invalid Item Text Font Edit Box 3120 shows the font properties of invalid (non-editable) fields in forms (read-only). Selection of the text box or the button 3119 in it opens a standard Windows Font dialog box. The Valid Optional Radio Button 3120 shows the appearance of valid, optional fields in the display-area sample at the bottom of the sub-tab. Selecting the Valid Required Radio Button 3122 shows the appearance of valid, required fields in the display-area sample at the bottom of the sub-tab. Selecting the Invalid Radio Button 3124 shows the appearance of invalid fields in the display-area sample at the bottom of the sub-tab. A sample area 3126 shows how valid optional, valid required or invalid fields will appear in the display area.

Figure 32:
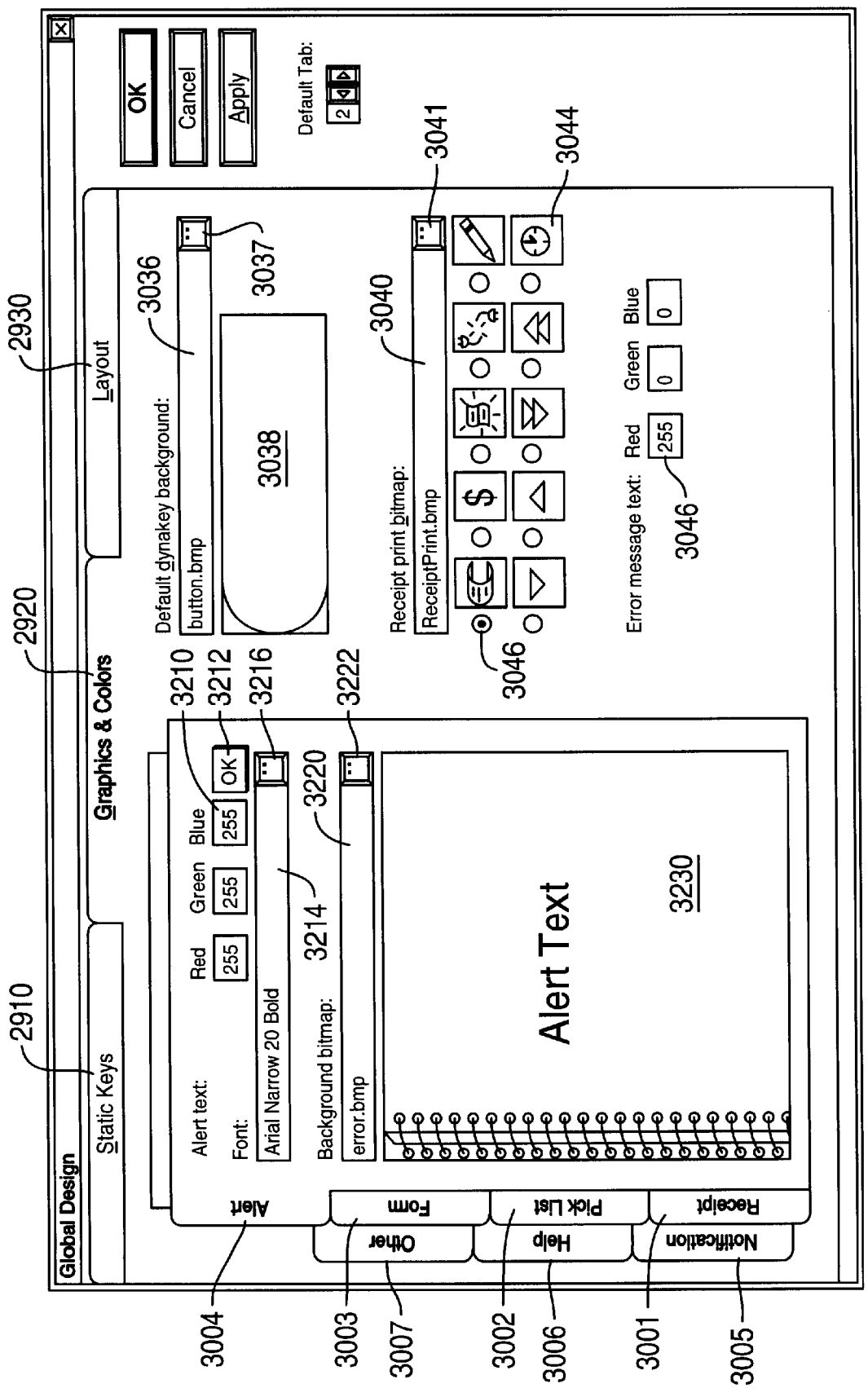
FIG. 32 is a view of a screen of a graphics and colors tab for the alert sub-tab.

As depicted in FIG. 32, the alert tab 3004 for a graphics and colors tab 2920 is selected from the global design dialog box 3000. There are identical controls on the Alert 3004, Notification 3005 and Help 3006 sub-tabs. The controls on the Alert 3004 sub-tab affect the appearance of alerts, the controls on the Notification 3005 sub-tab affect the appearance of notifications, and the controls on the Help 3006 sub-tab affect the appearance of help displays. As depicted in FIG. 32, the Color Edit Boxes 3210 allow entry of the red, green and blue (RGB) values for the text color. Selecting a Color OK Button 3212 refreshes the display sample at the bottom of the sub-tab with the text RGB values. A Text Font Edit Box 3214 shows the font properties of text (read-only). Selection of the text box or the button 3216 in it opens a standard Windows Font dialog box. The Background Bitmap Edit Box 3220 shows the name of the file containing the background bitmap (read-only). Selection of the text box or the button in it 3222 opens the Bitmap Selection dialog box. A Sample area 3230 shows how the display area will appear.

Figure 33:
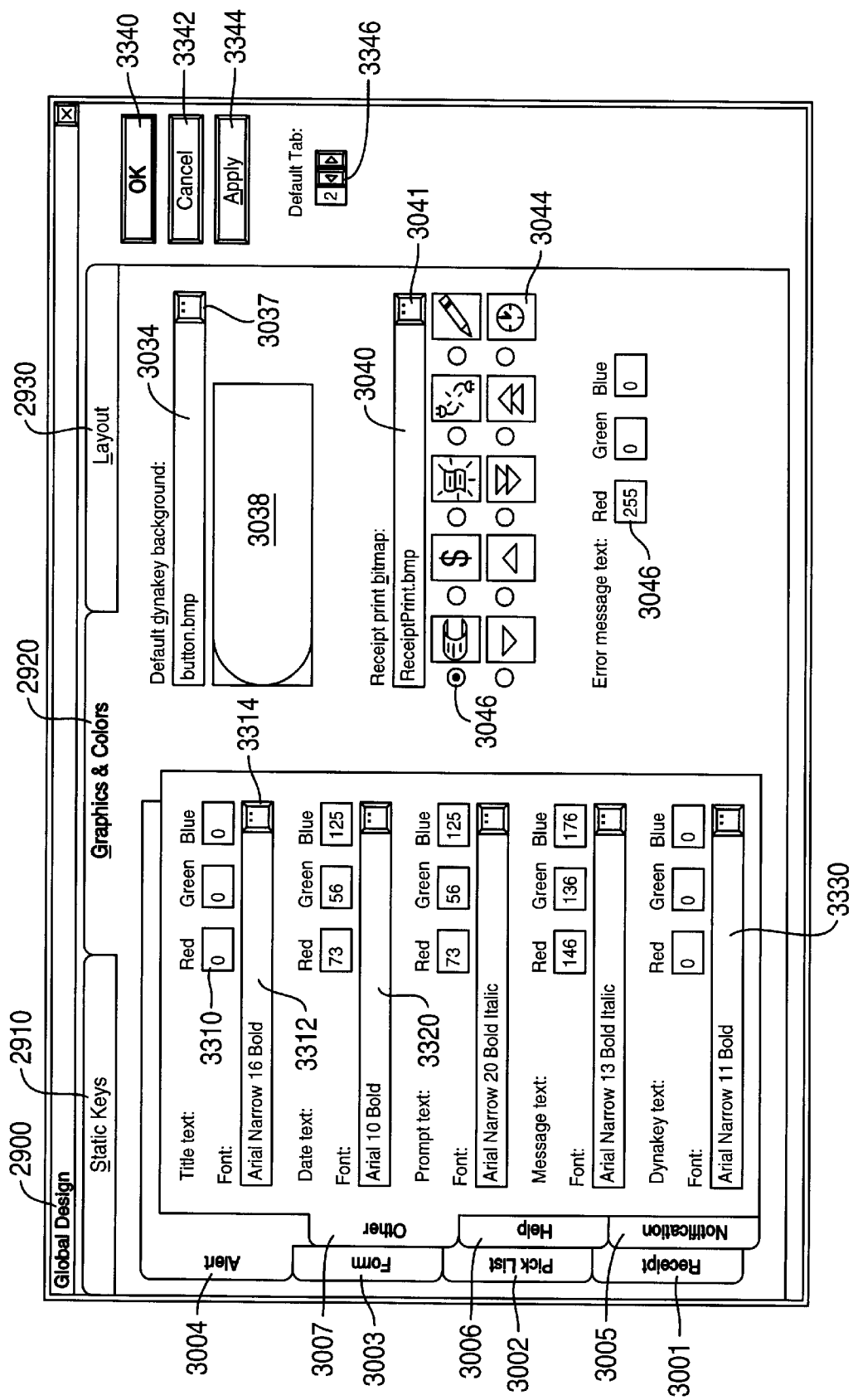
FIG. 33 is a view of a screen of a graphics and colors tab for the other sub-tab.

As depicted in FIG. 33, a screen depicting the Other Tab 3007 is depicted. The Color Edit Boxes 3310 allow entry of the red, green and blue (RGB) values for the title, date, prompt, message and Dynakey text color. The Text Font Edit Box 3312 shows the font properties of title, date, prompt, message and Dynakey text (read-only). Selecting of a text box or the button in it 3314 opens a standard Windows Font Dialog box.

Figure 34:
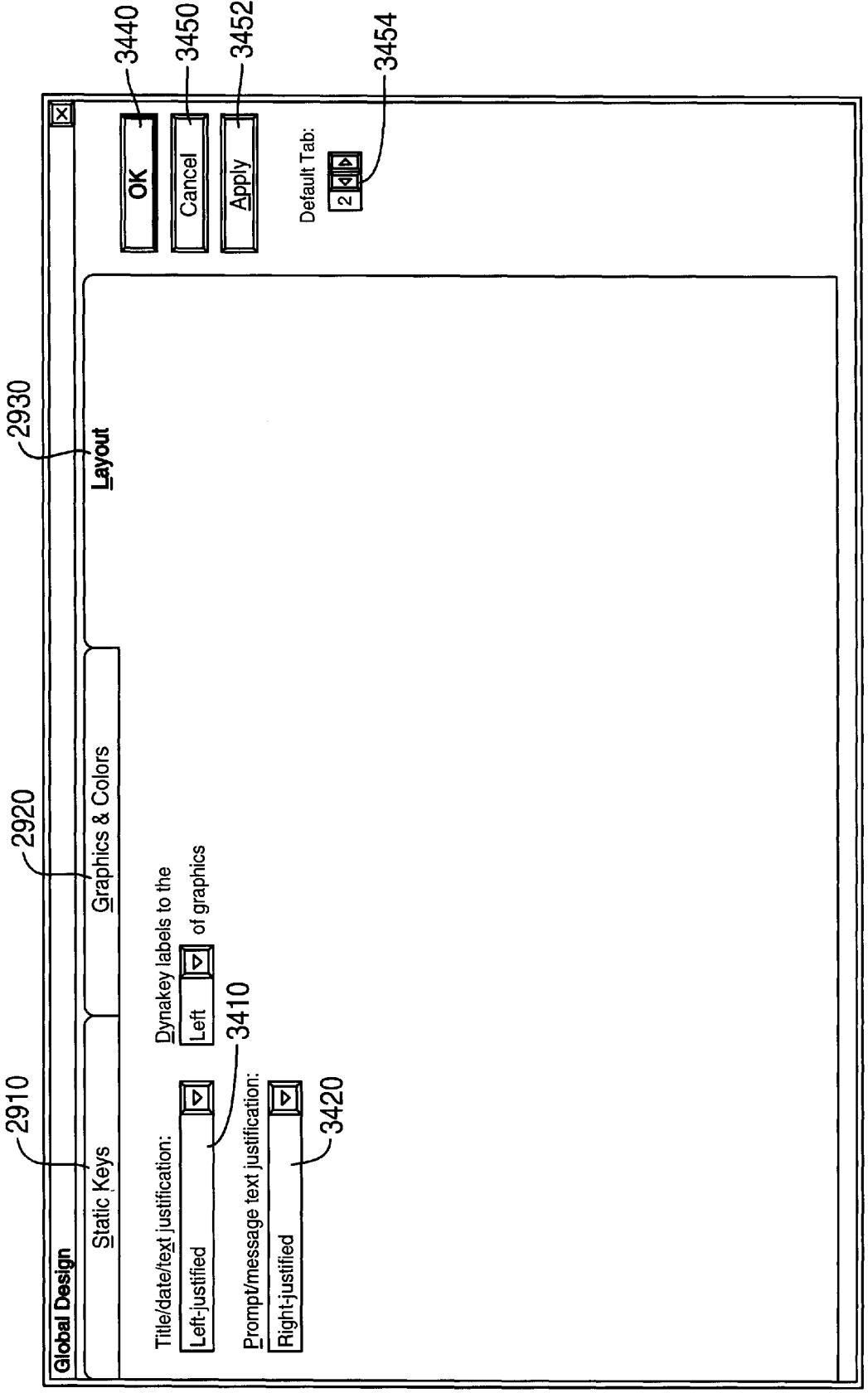
FIG. 34 is a view of a screen for a layout tab.

As depicted in FIG. 34, selecting the Title/Date Text Justification Dropdown List 3410 allows selection of Left-justified, Centered, or Right-justified for the title and time/date text on the user screen. Selecting the Prompt/Message Text Justification Dropdown List 3420 allows selecting of Left-justified, Centered, or Right-justified for the prompt and message text on the user screen. Selecting the Dynakey Labels Dropdown List 3430 allows selection of Left or Right for Dynakey labels in relation to foreground Dynakey graphics on the user screen. Selecting the OK Button 3440 saves all the settings to the database, applies them to the user screen, and closes the dialog box. Selecting the Cancel Button 3450 closes the dialog box without performing any actions. Selecting the Apply Button 3452 saves all the settings to the database and applies them to the user screen, and leaves the dialog box open. Selecting the Default Tab Spin Box 3454 allows the user to select any of the four tabs in the dialog box as the default tab. The default tab is the initial tab to display when the dialog first opens.

Figure 35:
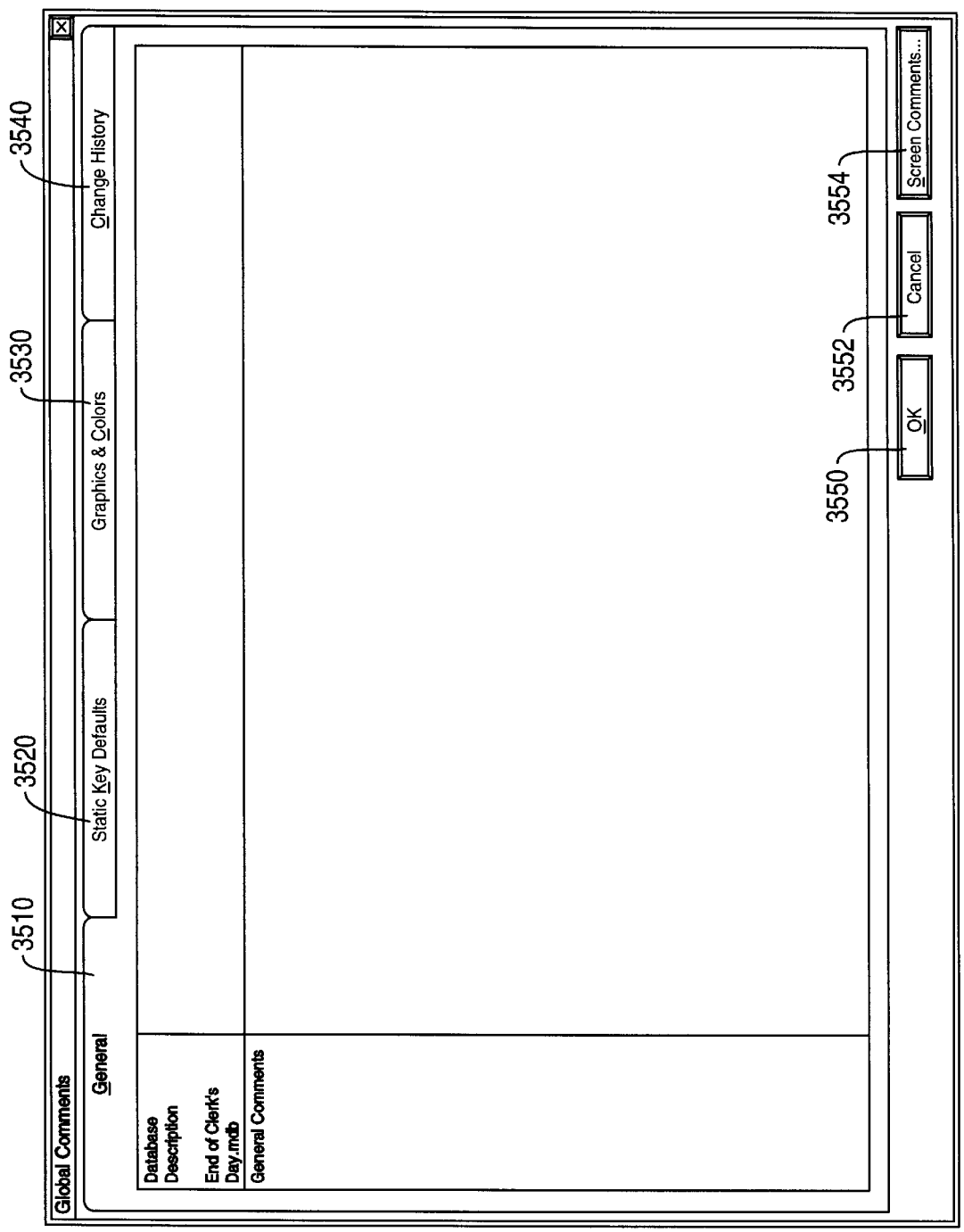
FIG. 35 is a view of a screen for a general comments tab for global comments.
Figure 36:
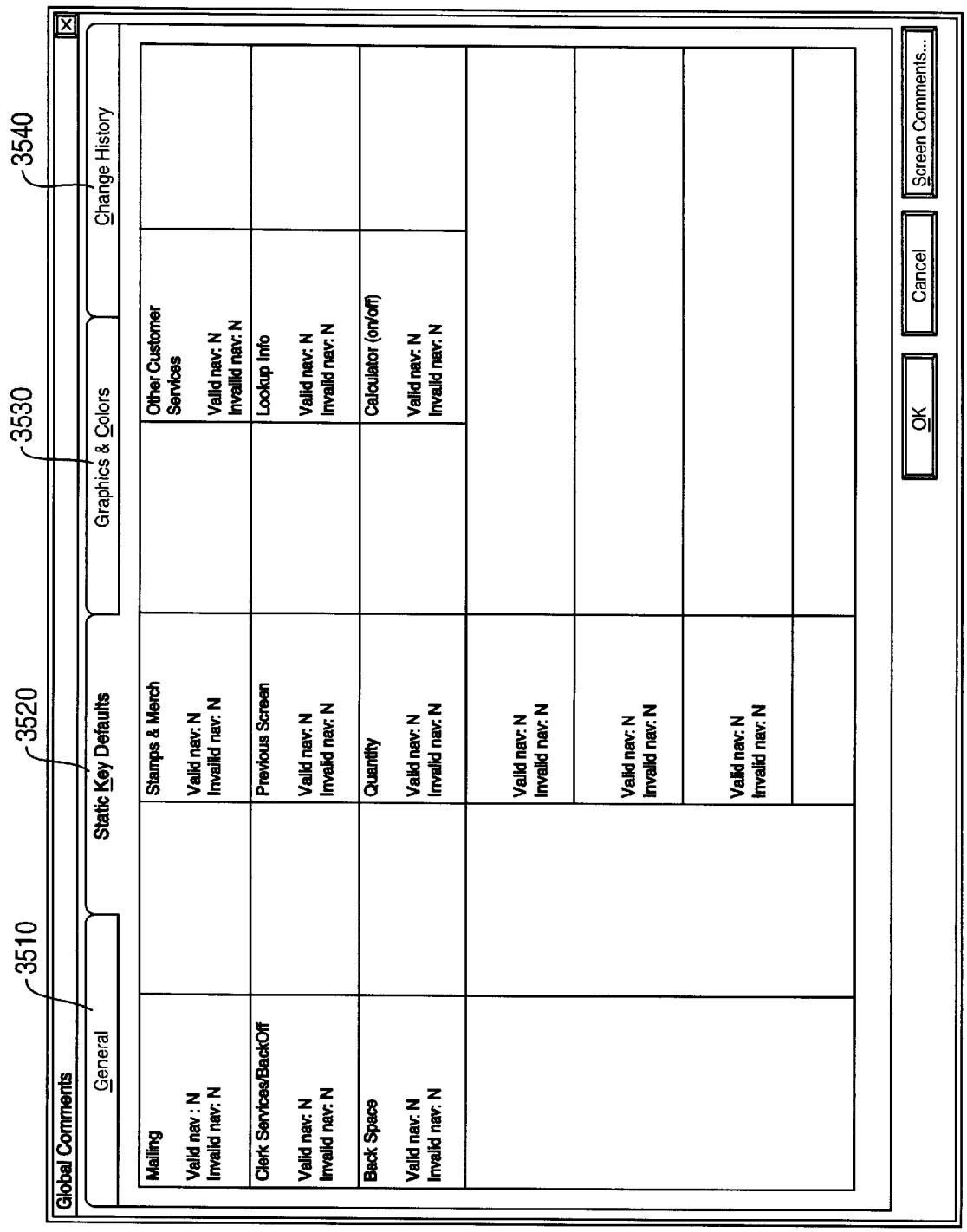
FIG. 36 is a view of a screen for a static defaults tab for global comments.
Figure 38:
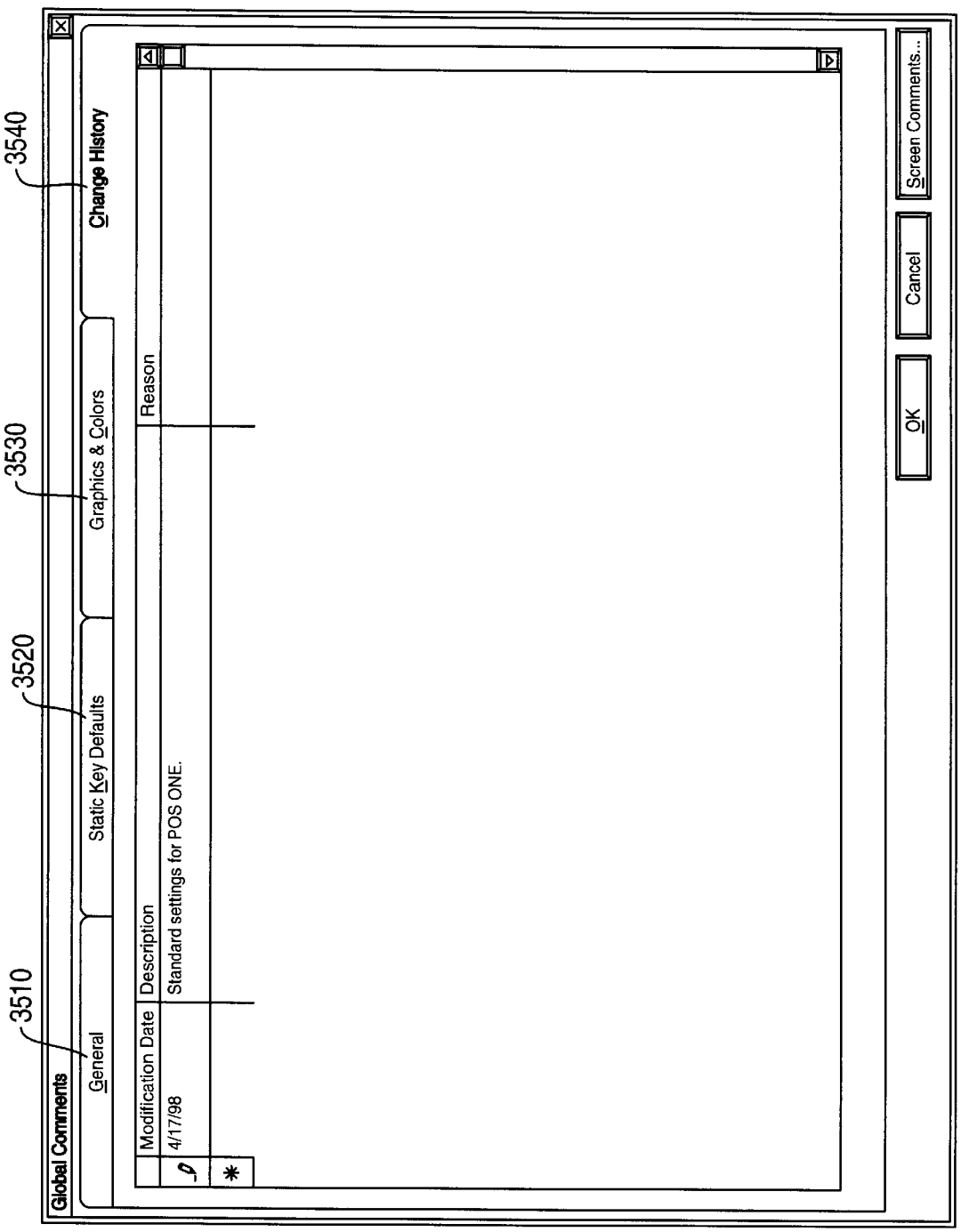
FIG. 38 is a view of a screen for a change history tab for global comments.

The Global Comments Dialog Box 3500 is depicted in FIG. 35. This screen displays the general tab 3510. There is also a static key defaults tab 3520, a graphics and colors tab 3530 and a change history tab 3540. The Global Comments Dialog Box 3500 displays properties set in the Global Design dialog box 2900 and allows entry of comments. The cells with a dark gray background display the area of the target user interface to which the comments pertain. The cells with a medium-gray background display the automatically documented properties of the area. The cells with a white background allow entry of comments. Selecting the Default Tab Spin Box 3454 (FIG. 34) allows the user to select any of the four tabs in the dialog box as the default tab. The default tab is the initial tab to display when the dialog first opens. Selecting the OK Button 3550 saves the comments to the database and closes the dialog box. Selecting the Cancel Button 3552 closes the dialog box without performing any actions. Selecting the Screen Comrnments Button 3554 opens the Screen Comments dialog box 2400. Similarly, by selecting the static key defaults tab 3520, the static key defaults screen depicted in FIG. 36 is displayed. By selecting the graphics and colors tab 3530, the graphics and colors screen depicted in FIG. 37 is displayed. By selecting the change history tab 3540, the change history screen depicted in FIG. 38 is displayed.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of graphically specifying a graphical user interface using information in tables stored in a relational database, comprising:
   displaying a target screen being divided into a title and input area, a receipt and status area, a dynamic key area and a static key area in which a plurality of generic keys, a plurality of screen information buttons and a display area are graphically displayed;
   selecting any one of the generic keys, the screen information buttons and the display area;
   graphically displaying a screen associated with the selected key, button or display area from a table in the relational database; and
   designating settings by accessing one or more tables in the relational database for the selected key, button or display area, the settings being graphically displayed.

2. The method of claim 1, comprising opening an existing relational database and designating locations of bitmap directory folders.

3. The method of claim 1, wherein at least some of the plurality of generic keys are dynamic keys, and said designating settings step includes, for each dynamic key, providing a label.

4. The method of claim 3, further comprising, after said designating settings step has been completed for desired keys, buttons and display area, navigating to a different screen display or to the display area on the target screen using one of said dynamic keys.

5. The method of claim 3, wherein the settings for each of said dynamic keys are designated so that the selection of the dynamic key will navigate to a screen identifier, to a previously viewed screen, perform no action, display a check box, display a radio button, navigate to a saved screen identifier, or toggle a check box in the display area.

6. The method of claim 1, further comprising, after said designating settings step has been completed for desired keys, buttons and display area, running the graphical user interface.

7. The method of claim 1, further comprising storing the designated settings in the relational database.

8. The method of claim 1, wherein the display area is configured to display one of a form, a pick list, an electronic receipt, a notification, an alert, a help display and a freeform display.

9. The method of claim 8, further comprising entering user input in the display area using at least one of an alphanumeric keyboard and static keys representing a numeric keypad, the user input varying depending on whether the form, the pick list, the electronic receipt, the notification, the alert, the help display or the freeform display is currently being displayed.

10. The method of claim 1, wherein the plurality of generic keys includes a numeric keypad graphically displayed in the static key area.

11. The method of claim 1, wherein the generic keys include dynamic keys and static keys and comprising for a selected dynamic key, designating a selectable background graphic, a label, and a selected foreground graphic.

12. The method of claim 1, further comprising deleting a current screen from the relational database and navigational links from other screens to the deleted screen.

13. The method of claim 1, wherein at least some of the plurality of generic keys arc static keys, and further comprising selecting one of the static keys and either navigating to a different screen, performing a backspace in a user input area in the display area, performing an enter function or entering a quantity.

14. The method of claim 1, further comprising selecting a different target screen for display.

15. The method of claim 14, wherein the selecting a different screen step is performed using a dialog box.

16. The method of claim 1, further comprising naming each screen and storing the screen names in a searchable list and searching the list for a stored screen name.

17. The method of claim 1, further comprising changing a screen identifier for a current screen.

18. The method of claim 1, wherein at least some of the plurality of generic keys are static keys, and each of the static keys displays a label previously assigned to the static key.

19. The method of claim 1, wherein the plurality of generic keys includes up/down scroll keys graphically displayed in the static key area.

20. An article comprising:
   at least one sequence of machine executable instructions;
   a medium bearing the executable instructions in machine readable form, wherein execution of the instructions by one or more processors causes the one or more processors to:
   display a target screen being divided into a title and input area, a receipt and status area, a dynamic key area and a static key area in which a plurality of generic keys, a plurality of screen information buttons and a display area are graphically displayed;

select any one of the generic keys, the screen information buttons and the display area;

graphically display a screen associated with the selected key, button or display area from a table in the relational database; and designate settings by accessing one or more tables in the relational database for the selected key, button or display area, the settings being graphically displayed.

21. A computer system, comprising:

a processor; and a memory coupled to said processor, the memory having stored therein sequences of instructions, which, when executed by said processor, causes said processor to perform the steps of:

displaying a target screen being divided into a title and input area, a receipt and status area, a dynamic key area and a static key area in which a plurality of generic keys, a plurality of screen information buttons and a display area are graphically displayed;

selecting any one of the generic keys, the screen information buttons and the display area;

graphically displaying a screen associated with the selected key, button or display area from a table in the relational database; and designating settings by accessing one or more tables in the relational database for the selected key, button or display area, the settings being graphically displayed.

22. A method of graphically specifying and executing a graphical user interface using information stored in a relational database, comprising:

graphically generating a plurality of screens, each being associated with at least one table in the relational database and having a plurality of keys and a display area, said graphically generating comprising the steps of:

graphically displaying the keys and display area of a current screen of said plurality of screens from at least one associated table;

selecting any one of the keys and display area of the current screen;

graphically displaying settings for the selected key or display area from said at least one associated table; and designating the settings, by accessing said at least one associated table or one or more other tables in the relational database, for the selected key or display area; and executing the graphical user interface;

wherein said graphically generating and said executing are performed without compiling the graphical user interface into a standalone executable program.

23. The method of claim 22, wherein the settings for at least one of the keys are designated so that, during said execution of the graphical user interface, selection of said at least one of the keys will either navigate to another screen of said plurality of screens or perform an action in the display area of the current screen.

24. The method of claim 22, wherein the settings for at least one of the keys are designated so that, during said execution of the graphical user interface, said at least one of the keys is disable.

25. The method of claim 22, wherein said graphically generating further comprises storing the designated settings in said at least one associated table of the current screen.

26. The method of claim 22, wherein said graphically generating further comprises assigning a unique identifier for each of said plurality of screens, and storing the identifiers in a searchable hierarchical list.

27. The method of claim 22, wherein said graphically generating and said executing are performed in a single computing environment.

* * * * *